(12) United States Patent
Fu et al.

(10) Patent No.: US 10,825,219 B2
(45) Date of Patent: Nov. 3, 2020

(54) SEGMENTATION GUIDED IMAGE GENERATION WITH ADVERSARIAL NETWORKS

(71) Applicant: Northeastern University, Boston, MA (US)

(72) Inventors: Yun Fu, Wellesley, MA (US); Songyao Jiang, Everett, MA (US)

(73) Assignee: Northeastern University, Boston, MA (US)

( * ) Notice: Subject to any disclaimer, the term of this patent is extended or adjusted under 35 U.S.C. 154(b) by 53 days.

(21) Appl. No.: 16/361,941

(22) Filed: Mar. 22, 2019

(65) Prior Publication Data

US 2019/0295302 A1 Sep. 26, 2019

Related U.S. Application Data

(60) Provisional application No. 62/666,187, filed on May 3, 2018, provisional application No. 62/646,673, filed on Mar. 22, 2018.

(51) Int. Cl.
*G06K 9/00* (2006.01)
*G06T 11/60* (2006.01)
(Continued)

(52) U.S. Cl.
CPC ............ *G06T 11/60* (2013.01); *G06K 9/6262* (2013.01); *G06K 9/726* (2013.01); *G06N 3/08* (2013.01);
(Continued)

(58) Field of Classification Search
None
See application file for complete search history.

(56) References Cited

U.S. PATENT DOCUMENTS 10,504,268 B1 * 12/2019 Huang ..................... G06F 3/011
10,552,714 B2 * 2/2020 Kiapour ............. G06Q 30/0625

OTHER PUBLICATIONS

Ding et al., "ExprGAN: facial expression editing with controllable expression intensity", published Sep. 13, 2017 (Year: 2017).*
(Continued)

*Primary Examiner* — Soo Jin Park
(74) *Attorney, Agent, or Firm* — Hamilton, Brook, Smith & Reynolds, P.C.

(57) ABSTRACT

Embodiments provide methods and systems for image generation through use of adversarial networks. An embodiment trains an image generator comprising (i) a generator implemented with a first neural network configured to generate a fake image based on a target segmentation, (ii) a discriminator implemented with a second neural network configured to distinguish a real image from a fake image and output a discrimination result as a function thereof and (iii) a segmentor implemented with a third neural network configured to generate a segmentation from the fake image. The training includes (i) operating the generator to output the fake image to the discriminator and the segmentor and (ii) iteratively operating the generator, discriminator, and segmentor during a training period, whereby the discriminator and generator train in an adversarial relationship with each other and the generator and segmentor train in a collaborative relationship with each other.

20 Claims, 26 Drawing Sheets
(23 of 26 Drawing Sheet(s) Filed in Color)

(51) Int. Cl.
*G06N 3/08* (2006.01)
*G06T 7/11* (2017.01)
*G06T 7/00* (2017.01)
*G06K 9/62* (2006.01)
*G06K 9/72* (2006.01)

(52) U.S. Cl.
CPC .............. *G06T 7/0002* (2013.01); *G06T 7/11* (2017.01); *G06T 2207/20081* (2013.01); *G06T 2207/20084* (2013.01); *G06T 2207/30201* (2013.01); *G06T 2207/30248* (2013.01)

(56) References Cited

OTHER PUBLICATIONS

Barth et al., "Improved part segmentation performance by optimizing realism of synthetic images using cycle generative adversarial networks", published Mar. 16, 2018 (Year: 2018).*

Choi et al., "Stargan: Unified Generative Adversarial Networks for Multi-Domain Image-to-Image Translation," arXiv:1711.09020v3 [cs.CV] Sep. 21, 2018 (15 pages).

Goodfellow et al., "Generative Adversarial Nets," Departement d'informatique et de recherche operationnelle, Universite de Montreal, Montreal, QC H3C 3J7, 2014 (9 pages).

Gulrajani et al., "Improved Training of Wasserstein GANs," arXiv:1704.00028 v3 [cs.LG] Dec. 25, 2017 (20 pages).

Isola et aL, "Image-to-Image Translation with Conditional Adversarial Networks," arXiv:1611.07004v3 [cs.CV] Nov. 26, 2018 (17 pages).

Liu et al., "Unsupervised Image-to-Image Translation Networks," arXiv:1703.00848v6 [cs.CV] Jul. 23, 2018 (11 pages).

Odena et al., "Conditional Image Synthesis with Auxiliary Classifier GANs," arXiv.1610.09585v4 [stat.ML] Jul. 20, 2017 (12 pages).

Zhu et al., "Unpaired Image-to-Image Translation using Cycle-Consistent Adversarial Networks," arXiv:1703.10593v6 [cs.CV] Nov. 15, 2018 (18 pages).

* cited by examiner

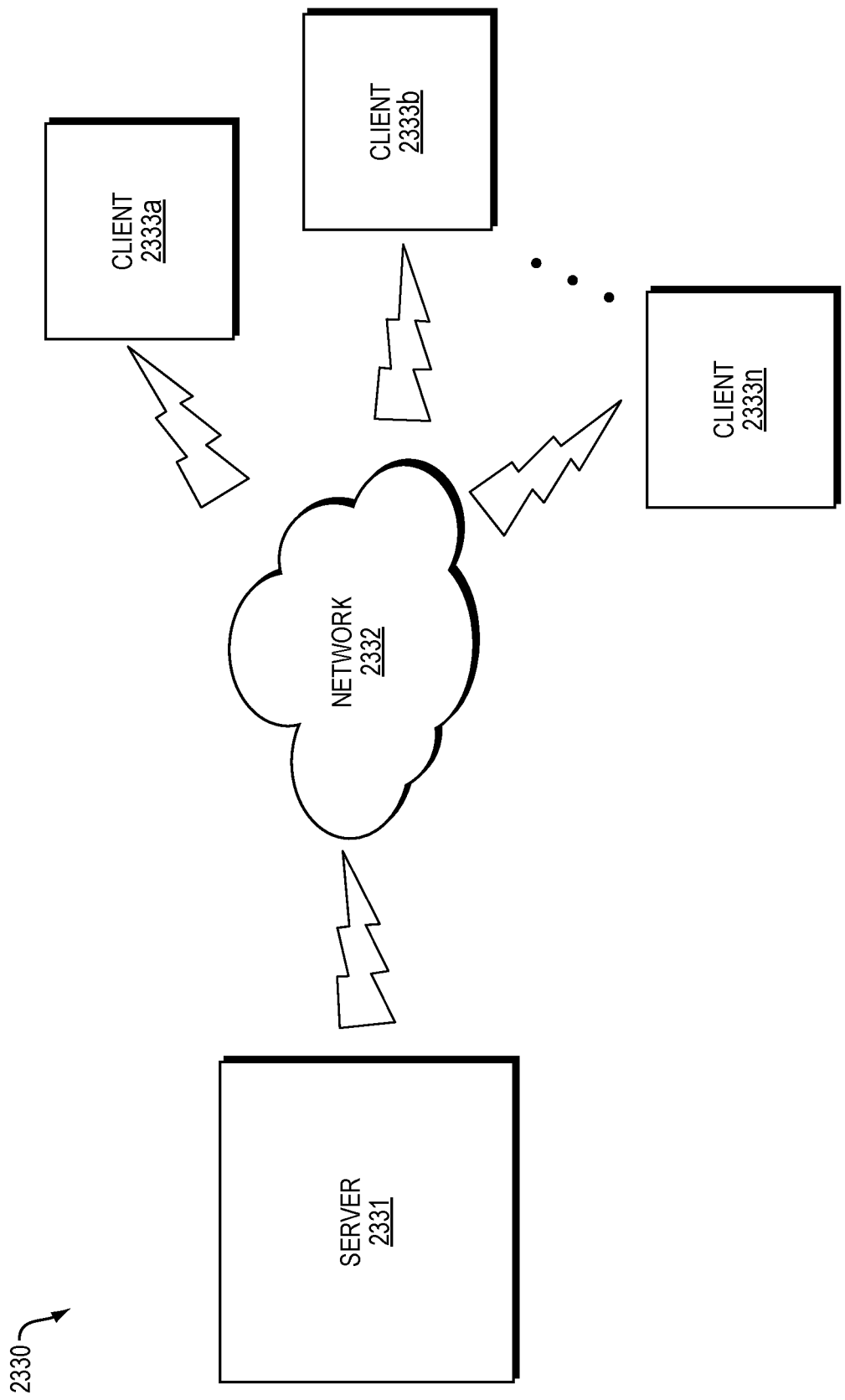

SEGMENTATION GUIDED IMAGE GENERATION WITH ADVERSARIAL NETWORKS

RELATED APPLICATIONS

This application claims the benefit of U.S. Provisional Application No. 62/666,187 filed on May 3, 2018 and U.S. Provisional Application No. 62/646,673, filed on Mar. 22, 2018. The entire teachings of the above applications are incorporated herein by reference.

BACKGROUND

Generating images by image-to-image translation, i.e., modifying an existing image, and image synthesis, i.e., creating an original image with desired characteristics and features, has become increasing popular. The popularity of image generation has also increased as the use of cameras has become ubiquitous.

SUMMARY

While image generation has become increasingly popular, existing methods of image generation oftentimes create low quality, unrealistic images. Embodiments of the present invention provide improved methods and systems for image generation through use of adversarial networks.

An example embodiment is directed to a system for training an image generator. In an embodiment, the system comprises a processor and a memory with computer code instructions stored thereon, wherein the processor and the memory, with the computer code instructions, are configured to cause the system to provide a generator, discriminator, and segmentor. In an embodiment of the system, the generator is implemented with a first neural network configured to generate a fake image based on a target segmentation. A fake image is a processor-generated image, where the processor may be a neural network, and a target segmentation, according to an embodiment, is a set of segments, e.g., sets of pixels or set of contours, that correspond to portions or landmarks, e.g., eyes, nose, mouth etc., of an image. Further, in such an embodiment, the discriminator is implemented with a second neural network configured to distinguish a real image from a fake image and output a discrimination result as a function thereof, and the segmentor is implemented with a third neural network configured to generate a segmentation from the fake image. To train the generator, according to an embodiment, the generator outputs the fake image to the discriminator and the segmentor, and iterative operation of the generator, discriminator, and segmentor during a training period causes: the discriminator and generator to train in an adversarial relationship with each other and the generator and segmentor to train in a collaborative relationship with each other. In an embodiment, training in an adversarial relationship means that training one element, e.g., the discriminator, undermines, the training of the other element, and vice versa, and training in a collaborative relationship means that training one element, e.g., the generator, also enhances the training of another element, e.g., the segmentor, and vice versa. According to an embodiment, at the end of the training period, the generator has its first neural network trained to generate the fake image based on the target segmentation with more accuracy than at the start of the training period.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 23 is a simplified block diagram of a computer network environment in which an embodiment of the present invention may be implemented.

DETAILED DESCRIPTION

Figure 1:
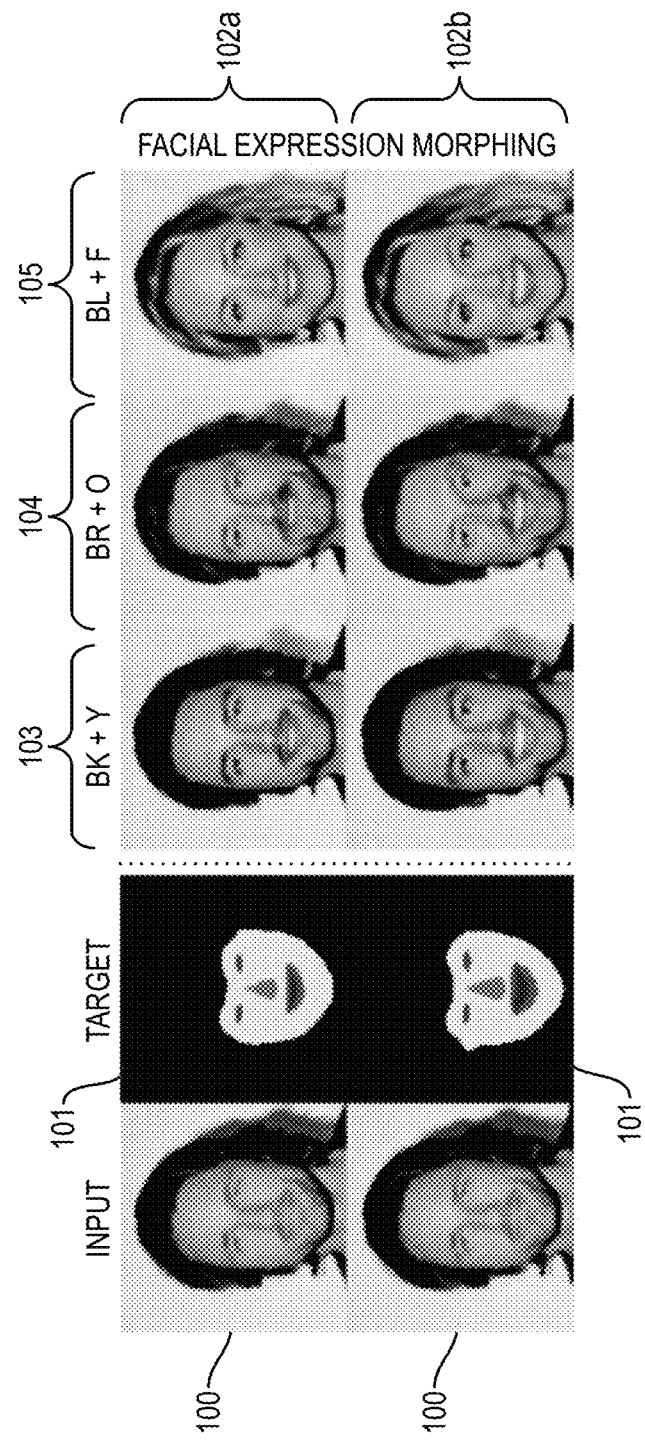
FIG. 1 depicts images that may be generated by embodiments.

A description of example embodiments follows.

Recently, image-to-image translation, which aims to map images in one domain to another specific domain, has received increasing attention. Existing methods mainly solve this task via a deep generative model, and focus on exploring a relationship between different domains. These methods, however, do not utilize higher-level and instance-specific information to guide the training process for neural networks used to perform the image generation, e.g., image-to-image translating. Neglecting this higher-level and instance-specific information leads to generating low quality and unrealistic images. Existing methods also lack spatial controllability during translation. To address the shortcomings of existing methodologies, embodiments use a novel Segmentation Guided Generative Adversarial Network (SGGAN), which leverages semantic segmentation to improve image generation performance further and provide spatial mapping. In particular, embodiments employ a segmentor implemented with a neural network that is designed to impose semantic information on the generated images. Experimental results on multi-domain image-to-image translation empirically demonstrates the ability of embodiments to control spatial modification and the superior quality of images generated by embodiments compared to state-of-the-art methods.

Image-to-Image translation aims to map an image in a source domain to the corresponding image in a target domain [Liu et al., "Unsupervised image-to-image translation networks," arXiv preprint arXiv:1703.00848, 2017] and, in essence, generalizes a wide range of computer vision and graphic tasks, such as image super-resolutions [Ledig et al., "Photo-realistic single image super-resolution using a generative adversarial network," arXiv preprint, 2016] (low-resolution to high-resolution), semantic segmentation [Luc et al., "Semantic segmentation using adversarial networks," arXiv preprint arXiv:1611.08408, 2016] (image to semantics), style transfer [Johnson et al., "Perceptual losses for real-time style transfer and superresolution," In ECCV, 2016] and face recognition [Yang et al., "Identity-adaptive facial expression recognition through expression regeneration using conditional generative adversarial networks," In FG, 2018.]. Among these topics, face image domain translation, [Kaneko et al., "Generative attribute controller with conditional filtered generative adversarial networks"], draws increasing attention, wherein domain denotes face images with the same attribute (e.g., hair color, gender, age, and facial expressions), and the task is to change the attributes for a given face image.

Recently, generative adversarial networks (GAN) [Goodfellow et al., Generative adversarial nets, In NIPS, 2014] have emerged as a powerful tool for generative tasks, and significantly thrive in the field of deep generative models. Because GAN has the potential to provide realistic image generation results and alleviate the deficiency of training data, a great deal of research efforts [Liu et al., "Unsupervised image-to-image translation networks," arXiv preprint arXiv:1703.00848, 2017; Zhu et al., "Unpaired image-to-image translation using cycle-consistent adversarial networks," arXiv preprint arXiv: 1703.10593, 2017; Kim et al., "Learning to discover crossdomain relations with generative adversarial networks," arXiv preprint arXiv:1703.05192, 2017; and Yi et al., "Dualgan: Unsupervised dual learning for image-to-image translation. arXiv preprint arXiv: 1704.02510, 2017] have been made to tackle image translation within GAN based frameworks. These methods generally implement a generator to generate images belonging to a target domain upon the input of source domain images and develop a discriminator to distinguish the generated images (i.e., fake samples) from the real ones (i.e., real samples). By leveraging an adversarial training scheme [Ian Goodfellow et al., "Generative adversarial nets," In NIPS, 2014.], the discriminator effectively supervises the training of the generator, and eventually delivers reliable results. Meanwhile, these existing methods often employ a cycle consistency [Zhu et al., "Unpaired image-to-image translation using cycle-consistent adversarial networks," arXiv preprint arXiv: 1703.10593, 2017] constraint to regulate the inter-domain relationships learning.

Though these GAN-based methods have achieved appealing progress, two challenges for the image translation task remain. First, the reliability of GAN-based methods is low, which inevitably limits the capability and flexibility for GAN applications. Previous methods mainly focus on exploring the underlying relationship between different domains, yet neglect to utilize the rich information inside images to boost image translating performance further. Specifically, existing methods only employ a discriminator to supervise the generator to capture the distribution of the target domain, and existing methods ignore the instance-level information (e.g., facial semantic segmentation) to ensure the image quality. This may badly lower the generation ability, and lead to unrealistic images, such as the notorious "ghost" faces. Second, since the training process of existing methods is built on domain-level labels without strong spatial regulation, existing methods lack the controllability of achieving gradually morphing effects, such as changing face shapes, orientations, and facial expressions.

To address the above challenges, embodiments implement a novel Segmentation Guided Generative Adversarial Network (SGGAN), which fully leverages semantic segmentation information to guide the image generation (e.g., translation) process. In embodiments, the image semantic segmentation can be obtained through a variety of methodologies, such as human annotations or any variety of existing segmentation methods. However, embodiments described herein focus on face image generation and, thus, employ an unsupervised way to obtain semantic segmentation information based on extracted facial landmarks. It is noted that embodiments are not limited to employing facial segmentation and may use any segmentation that is appropriate for the desired image generation task.

Embodiments provide numerous benefits. For instance, embodiments explicitly guide the generator with pixel-level semantic segmentations and, thus, further boost the quality of generated images. Further, the target segmentation employed in embodiments works as a strong prior, i.e., provides knowledge that stems from previous experience, for the image generator, which is able to use this prior knowledge to edit the spatial content and align the face image to the target segmentation. Thus, embodiments can simultaneously change facial attributes and achieve facial expression morphing without giving extra expression labels, as shown in FIG. 1.

FIG. 1 illustrates the results of an embodiment where, given the input image 100 and target segmentation 101, the proposed SGGAN translates the input image 100 to various combinations of various attributes shown in the columns 103 (black hair and young), 104 (brown hair and old), and 105 (blonde hair and female) while also morphing the input image to have a target facial expression, the two different smile types depicted in the rows 102a and 102b.

Figure 2A:
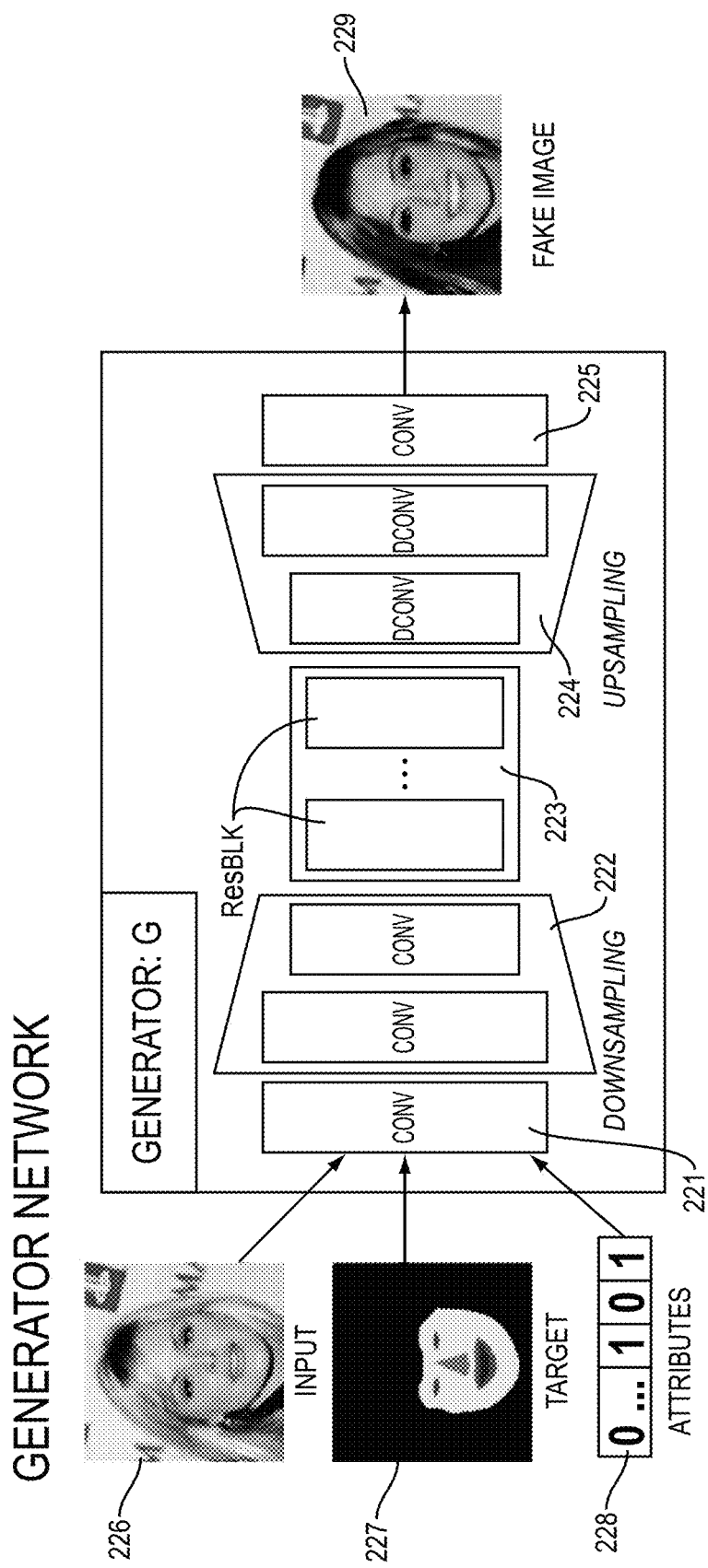
FIG. 2A depicts a generator neural network employed in embodiments.
Figure 2B:
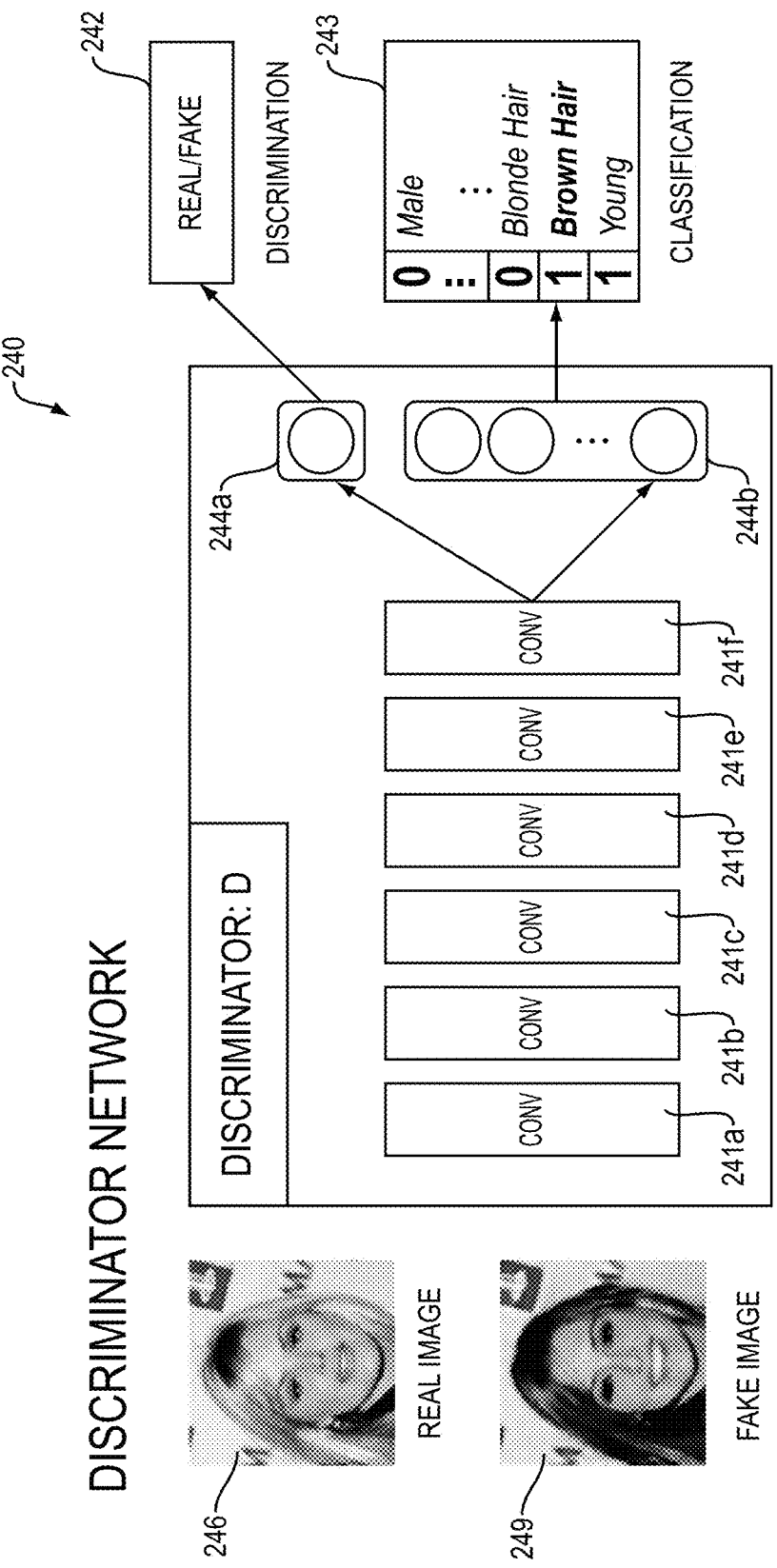
FIG. 2B illustrates a discriminator neural network implemented according to an embodiment.
Figure 2C:
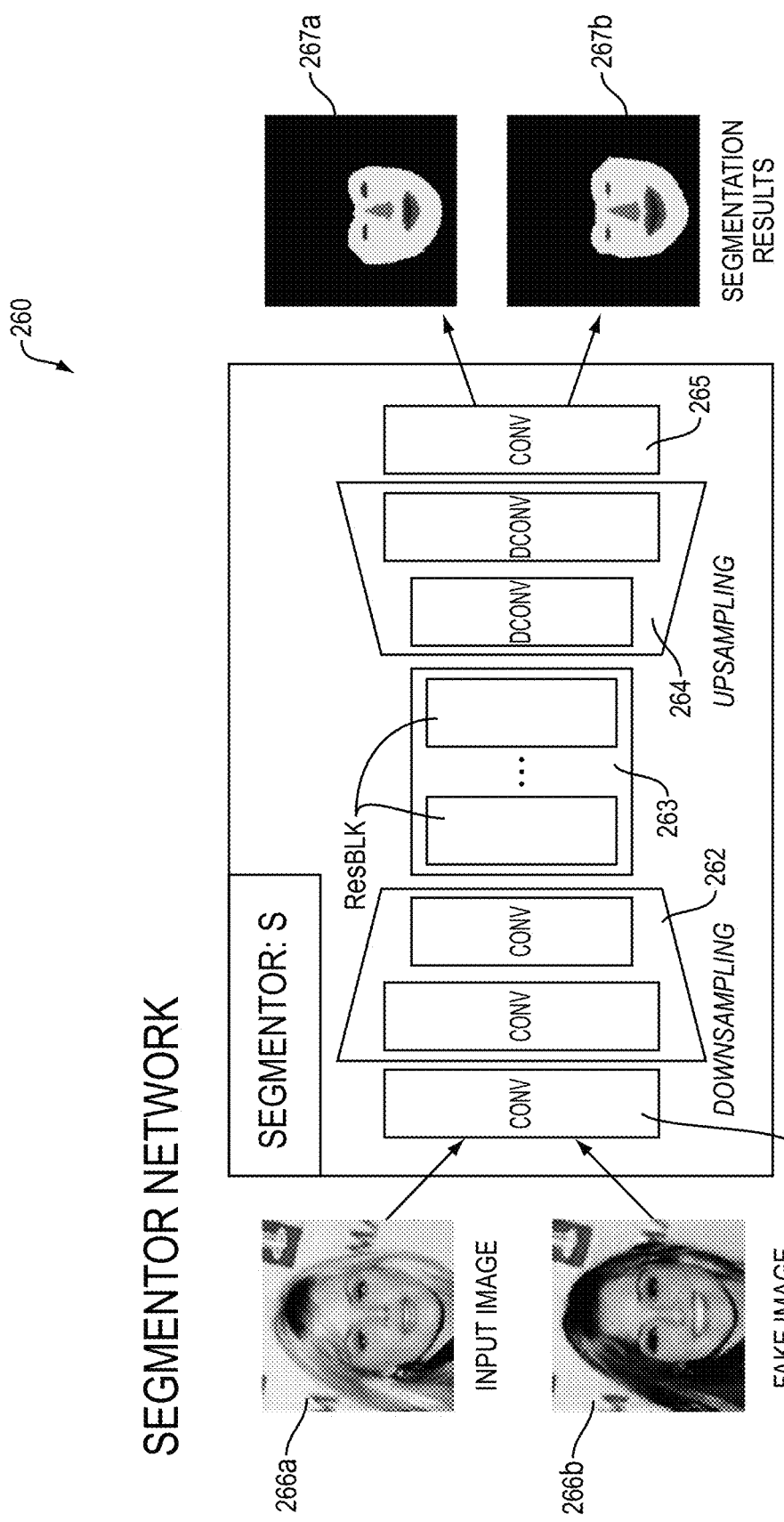
FIG. 2C is a simplified illustration of a segmentor neural network used in embodiments.

In detail, an embodiment of the proposed SGGAN framework comprises three networks, depicted in FIGS. 2A, 2B, and 2C, respectively, a generator network 220, a discriminator network 240, and a segmentor network 260. In an embodiment, the generator network 220 includes a convolutional block 221, a down-sampling convolutional block 222, a residual block 223, up-sampling convolutional block 224, and convolutional block 225. In an example embodiment, the residual block 223 is employed to provide bottleneck layers. Moreover, according to an embodiment, the residual block 223 is implemented as described in [Kaiming, et al., "Deep residual learning for image recognition," Proceedings of the IEEE conference on computer vision and pattern recognition, 2016]. The generator 240 takes as inputs, a target segmentation 227, a given image 226, and a vector 228 indicating desired attributes of the image to be generated. The generator 220 implemented with the blocks 221-225 is configured to receive the inputs 226, 227, 228 and generate a target image 229 that is based on, i.e., a translated version of, the input image 226 and consistent with the input segmentation 227 and attributes 228.

According to an embodiment, the discriminator 240 is implemented with the convolutional blocks 241a-f and output blocks 244a-b. The discriminator 240 is configured to take an image, e.g., the images 246 and/or 249 and produce a discrimination result 242 indicating if an input image is real, i.e., an image that did not get produced by the generator, or fake, i.e., an image created by the generator, and determine attributes 243 of the input image. The discriminator 240 pushes the generated images towards a target domain distribution, and meanwhile, utilizes an auxiliary attribute classifier to enable the SGGAN framework to generate images, such as the images in the row 102a in FIG. 1 with target attributes.

According to an embodiment, the segmentor neural network 260 includes a convolutional block 261, a down-sampling convolutional block 262, residual block 263 (which may be implemented similarly to the residual block 223 described hereinabove), up-sampling convolutional block 264, and convolutional block 265. The segmentor network 260 implemented with the blocks 261-265 is configured to receive an input image 266a and/or 266b and generate a corresponding segmentation 267a and/or 267b, respectively, indicating features of the input images 266a and/or 266b. The segmentor 260 imposes semantic information on the image generation process.

Figure 2D:
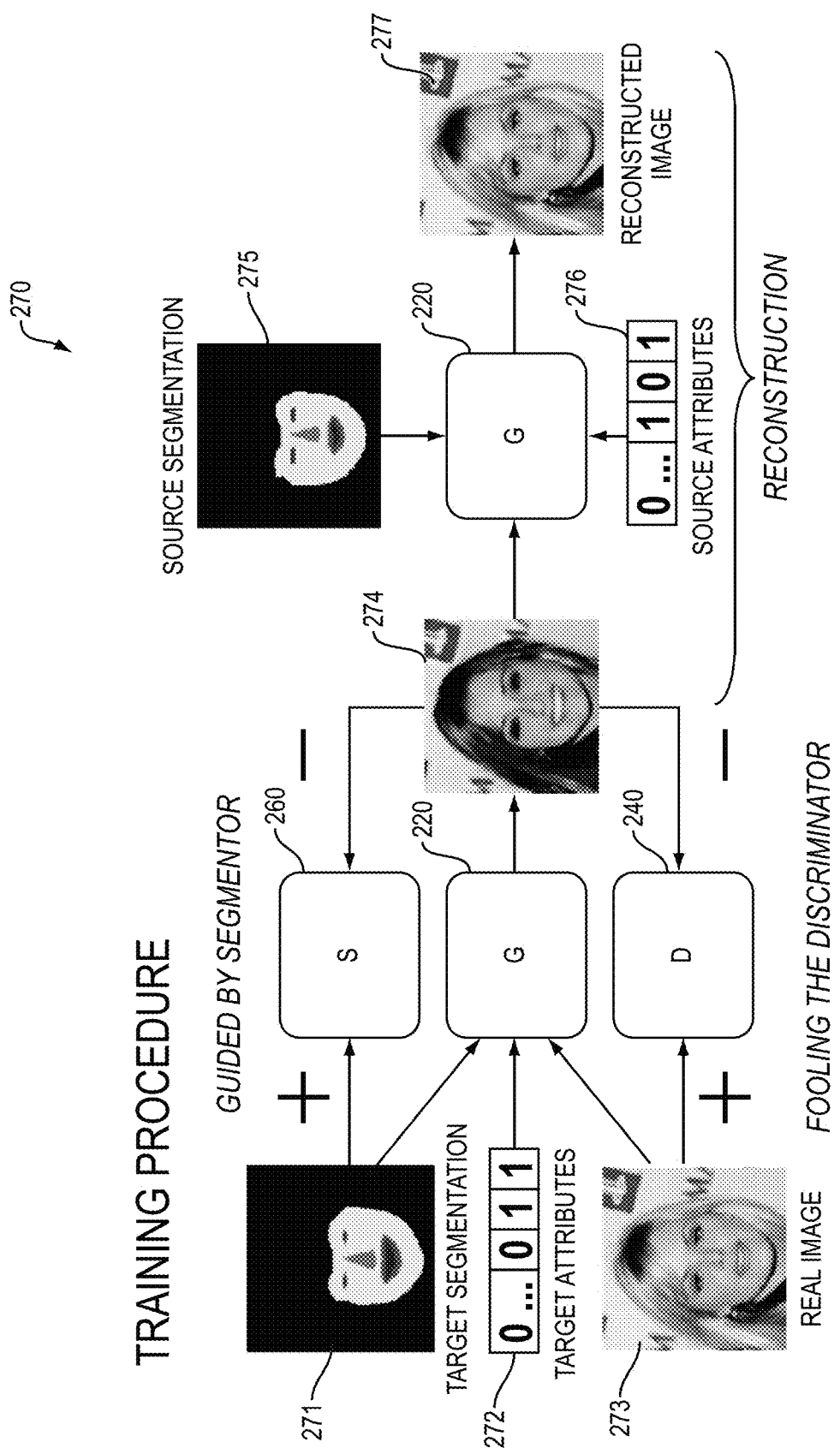
FIG. 2D is a simplified diagram illustrating a procedure for training the generator of FIG. 2A, discriminator of FIG. 2B, and segmentor of FIG. 2C.

FIG. 2D is a simplified diagram showing a training procedure 270 for training the segmentor 260, generator 220, and discriminator 240. During training, estimated segmentations from the segmentor 260 are compared with their ground-truth values, which provides gradient information to optimize the generator 220. This optimization tends to teach the generator 220 to impose the spatial constraints indicated in an input segmentation 271 on the translated images, e.g., 274. During the training 270, the segmentor 260 provides spatial guidance to the generator 220 to ensure the generated images, e.g., 274, comply with input segmentations, e.g., 271. The discriminator 240 aims to ensure the translated images, e.g., 274, are as realistic as the real images, e.g., 273.

In the training procedure 270, the segmentor 260 receives a target segmentation 271 and a generated image 274 produced by the generator 220. Then, based upon a segmentation loss, i.e., the difference between a segmentation determined from the generated image 274 and the target segmentation 271, the segmentor 260 is adjusted, e.g., weights in a neural network implementing the segmentor 260 are modified so the segmentor 260 produces segmentations that are closer to the target segmentation 271. The generator 240 is likewise adjusted based upon the segmentation loss to generate images that are closer to the target segmentation 271. In this way, the segmentor 260 and generator 220 are trained collaboratively.

In the training procedure 270, the generator 220 is configured to receive the target segmentation 271, desired attributes vector 272, and real image 273 and from the inputs 271-273, generate the image 274. Further, the generator 220 (which is depicted twice in FIG. 2D to show additional processing) is configured to perform a reconstruction process that attempts to reconstruct the input image 273 using a segmentation 275 that is based on the real image 273, attributes 276 of the real image 273, and the generated image 274. To train the generator 220, the generated image 274 is provided to the discriminator 240. The discriminator 240 makes a determination if the image 274 is real or fake and also determines attributes of the image 274. Then, based on these determinations, weights of the neural network implementing the generator 220 are adjusted so as to improve the generator's 240 ability to generate images that are in accordance with the desired attributes 272 and target segmentation 271 while also being indistinguishable from real images. Similarly, the generator 220 is also adjusted, i.e., weights of the neural network implementing the generator 220 are adjusted based on the reconstruction loss. In an embodiment, the reconstruction loss is the difference between the reconstructed image 277 and the real image 273.

The discriminator 240 is also trained as part of the training process 270. As described herein, the discriminator 240 determines attributes of an input image and determines if an input image is real or fake. Based upon these determinations, the discriminator 240 is adjusted, e.g., weights of a neural network implementing the discriminator 240 are changed, so that the discriminator 240 gets better at distinguishing real and fake images. Further, as described above, the generator is trained to get better at generating images that are indistinguishable from real images and, in this way, the generator 220 and discriminator 240 are trained adversarially.

Figure 3:
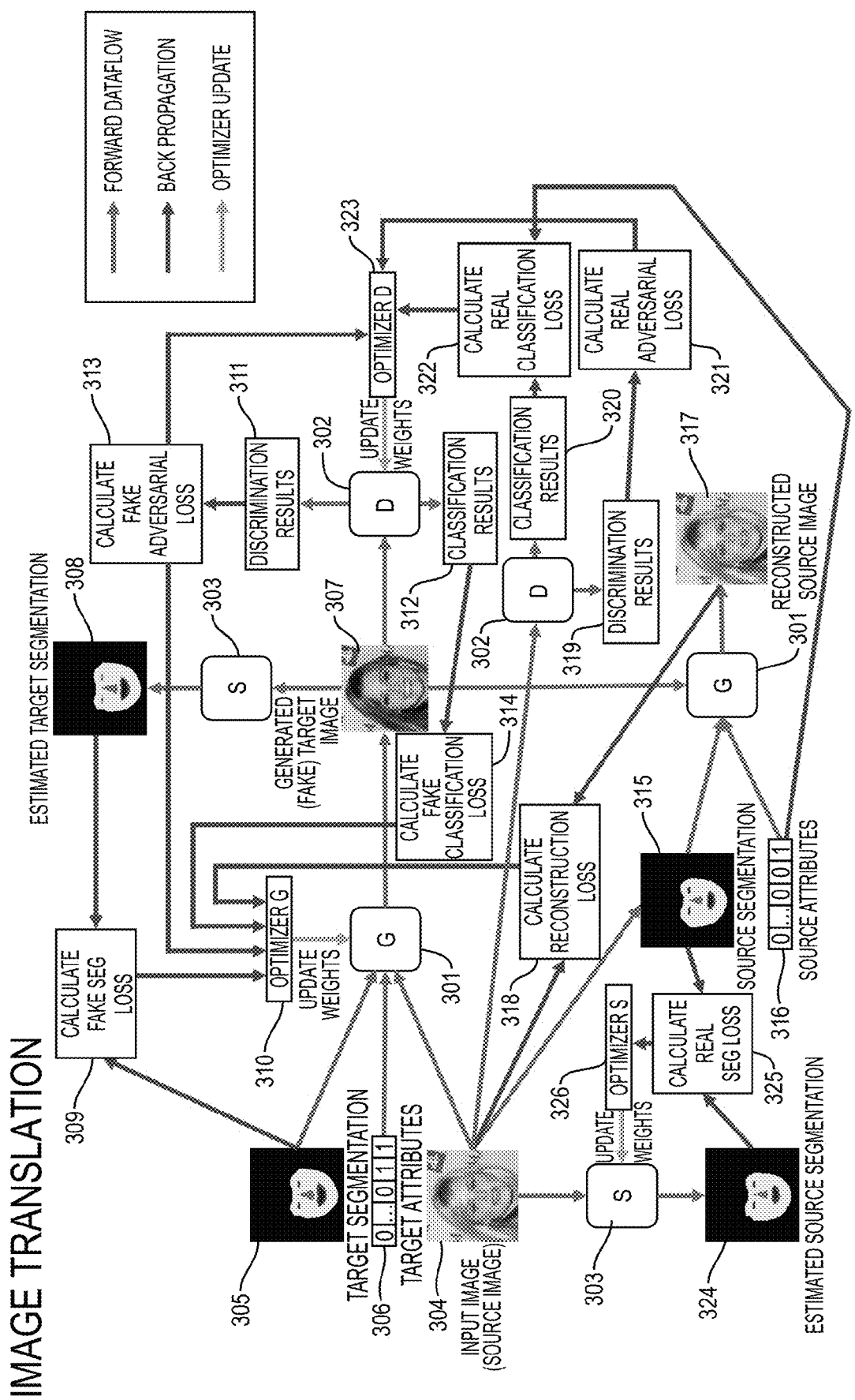
FIG. 3 is a block diagram illustrating a procedure for training an image generator according to an embodiment.

Extensive experiments on several image translation and face synthesis tasks empirically demonstrate the effectiveness of the proposed SGGAN and training procedure 270 and the training procedure described hereinbelow in relation to FIG. 3, compared with several state-of-the-art image translation methods. Further, image generation using the training methods described herein and resulting trained generator can spatially control the generation process, and provide interpretable results. Embodiments, provide a novel Segmentation Guided Generative Adversarial Networks (SGGAN) model which leverages semantic segmentation information to provide spatial constraints for the image translation task. Further, embodiments implement a segmentor network that is particularly designed to impose the target spatial guidance on the generator. Embodiments provide a general model for face synthesis which can generate face images with multi-domain attributes and also handle facial expression morphing.

FIG. 3 illustrates a process of training an image generator, i.e., an image generator system, comprising a generator 301, discriminator 302, and segmentor 303 according to an embodiment. It is noted that in FIG. 3, components, such as the generator 301, discriminator 302, and segmentor 303, are depicted multiple times and this is done to simplify the diagram.

The generator 301 is configured to receive three inputs, an input image (source image) 304, a target segmentation 305, and a vector of target attributes 306. A goal of the training process is to configure the generator 301 to translate the input image 304 into a generated image (fake image) 307, which complies with the target segmentation 305 and attribute labels 306.

During the training process, these three inputs (target segmentation 305, target attributes 306, and input image 304) are fed into the generator 301 to obtain the generated image 307. After generating the image 307, there are three paths. The first path is to input the generated image 307 to the segmentor 303. The segmentor 303 estimates a semantic segmentation 308 from the generated image 307, and the estimated segmentation 308 is then compared with the target segmentation 305 to calculate a fake segmentation loss 309 which is provided to the generator optimizer 310. According to an embodiment, loss calculations are determined by one or more optimizers, e.g., the optimizer 310, orchestrating the training process.

The second path of generator training feeds the generated image 307 to the discriminator 302, which determines a discrimination output 311 and a classification output 312. The discrimination output 311 is used to calculate the fake adversarial loss term 313, and the classification output 312 is used to calculate a fake classification loss 314. The fake adversarial loss 313 and fake classification loss 314 are fed to the optimizer 310.

The third path of generator training is a reconstruction loss path which takes the generated image 307 as an input to the generator 301, as well as two other inputs, a source segmentation 315 (which may be a ground-truth landmark based segmentation) and a source attributes label 316. This path is expected to reconstruct an image 317 from the generated fake image 307 that should match the input source image 304. The reconstructed image 317 is then compared with the input source image 304 to compute a reconstruction loss 318 which is provided to the generator optimizer 310.

The fake adversarial loss term 313, the fake segmentation loss 309, the fake classification loss 314, and the reconstruction loss 318 are used by the optimizer 310 to optimize the generator 301. In an embodiment, the optimizer 310 sums up the loses 313, 309, 314, and 318 with weights, i.e., weights the losses differently, to determine a generator loss, which is used by the optimizer 310 to do back-propagation and update the parameters in a neural network implementing the generator 301. According, to an embodiment, losses are summed as shown in the equation below:

$$\mathcal{L}_G = \mathcal{L}_{adv} + \lambda_1 \mathcal{L}_{cls}^{fake} + \lambda_2 \mathcal{L}_{seg}^{fake} + \lambda_3 \mathcal{L}_{rec} \quad (10)$$

where the weights $\lambda_1$, $\lambda_2$, and $\lambda_3$ are hyper-parameters chosen by a user.

To train the discriminator 302, the input source image 304 is fed to the discriminator 302 which generates the discrimination result 319 and classification result 320. The discrimination result 319 is used to calculate a real adversarial loss term 321, and the classification result 320 is compared with the real source attributes label 316 to calculate a real classification loss 322. The fake adversarial losses 313, real adversarial losses 321, and the real classification loss 322 are summed up and fed to the optimizer 323 to optimize the discriminator 302. In an embodiment, optimizing the discriminator 302 includes performing a back-propagation and updating the parameters, e.g., weights, in a neural network implementing the discriminator 302.

To train the segmentor 303, the input source image 304 is input to the segmentor 303 to obtain an estimated semantic segmentation 324. Then, this estimated segmentation 324 is compared with a ground-truth source segmentation 315, which may be a landmark based segmentation, to calculate a real segmentation loss 325. The optimizer 326 utilizes this loss 325 to do back-propagation and update the parameters in a neural network implementing the segmentor 303.

Generative Adversarial Networks based methods have become popular and have been successful in many computer vision tasks in recent years such as image super-resolution [Ledig et al., "Photo-realistic single image super-resolution using a generative adversarial network," arXiv preprint, 2016], semantic segmentation [Luc et al., "Semantic segmentation using adversarial networks," arXiv preprint arXiv:1611.08408, 2016], object detection [Li et al., "Perceptual generative adversarial networks for small object detection," In CVPR, 2017], video prediction [Mathieu et al., "Deep multi-scale video prediction beyond mean square error," arXiv preprint arXiv:1511.05440, 2015], classification [Yu et al., "Open category classification by adversarial sample generation," In IJCAI, 2017; Li et al., "End-to-end adversarial memory network for crossdomain sentiment classification," In IJCAI, 2017] and clustering [Wang et al., "Partial multi-view clustering via consistent GAN," In IEEE International Conference on Data Mining, pages 1290-1295, 2018]. Many research efforts have been made to improve GAN in stabilizing the training process and increasing the diversity of results [Zhao et al., "Energy-based generative adversarial network," In ICLR, 2017; Mao et al., "Least squares generative adversarial networks," In ICCV, 2017; Arjovsky et al., "Wasserstein generative adversarial networks," In ICML, 2017; Berthelot et al., "Began: Boundary equilibrium generative adversarial networks," arXiv preprint arXiv:1703.10717, 2017; Gulrajani et al., "Improved training of wasserstein gans," In NIPS, 2017], improving the visual quality and resolution of generated images [Wang et al., "High-resolution image synthesis and semantic manipulation with conditional gans," arXiv preprint arXiv: 1711.11585, 2017; Karras et al., "Progressive growing of gans for improved quality, stability, and variation," arXiv preprint arXiv:1710.10196, 2017], introducing controllability by adding conditional label information [Mirza et al., "Conditional generative adversarial nets," arXiv preprint arXiv: 1411.1784, 2014; Chongxuan et al., "Triple generative adversarial nets," In NIPS, 2017] and increasing the interpretability of GAN [Chen et al., "Infogan: Interpretable representation learning by information maximizing generative adversarial nets," In NIPS, 2016; Kaneko et al., "Generative attribute controller with conditional filtered generative adversarial networks," In CVPR, 2017].

Isola et al., "Image-to-image translation with conditional adversarial networks," arXiv preprint arXiv:1611.07004, 2016, proposes an image-to-image translation network called pix2pix which uses an image as the conditional input and trains the networks supervisedly with paired image data. It has been found that supervision is not necessary for the image-to-image translation task and unsupervised methods such as CycleGAN [Zhu et al., "Unpaired image-to-image translation using cycle-consistent adversarial networks," arXiv preprint arXiv: 1703.10593, 2017], DiscoGAN [Kim et al., Learning to discover cross-domain relations with generative adversarial networks," arXiv preprint arXiv: 1703.05192, 2017], DualGAN [Yi et al., "Dualgan: Unsupervised dual learning for image-to-image translation," arXiv preprint arXiv:1704.02510, 2017] and UNIT [Liu et al., "Unsupervised image-to-image translation networks," arXiv preprint arXiv:1703.00848, 2017] have been implemented. These methods are essentially two-domain image translation methods which translate images from their source domain to a target domain using one-to-one mappings.

Based on the work of the aforementioned existing methods, [Choi et al., "Stargan: Unified generative adversarial networks for multi-domain image-to-image translation,"

arXiv preprint arXiv:1711.09020, 2017] proposed a multi-domain image-to-image translation framework called Star-GAN which utilizes an auxiliary classifier following ACGAN [Odena et al., Conditional image synthesis with auxiliary classifier gans," arXiv preprint arXiv:1610.09585, 2016] to achieve a one-to-many mapping between a source domain and multiple target domains. The StarGAN method, however, neglects instance-level information and may generate unrealistic low-quality images and lacks spatial controllability. In contrast, embodiments of the present invention SGGAN framework differ from StarGAN in introducing instance-level target segmentations as strong regulations to guide the generating process which avoids flaws, improves visual quality, and makes the generated results spatially controllable.

Hereinbelow, a problem formulation, details of the segmentor network, and an overall objective function of an embodiment are provided.

Let x, s, and c be an image of size (H×W×3), with the segmentation map (H×W×$n_s$) and attributes vector (1×$n_c$) in the source domain; while y, s' and c' are its corresponding image, segmentation, and attributes in the target domain. The number of segmentation classes is denoted as $n_s$ as classes and the number of all the attributes is denoted as $n_c$. Note, that for s and s', each pixel is represented by a one-hot vector of $n_s$ classes, while for c and c', they are binary vectors of multiple labels, in the scenario of multi-domain translation. Given this formulation, a goal of an embodiment is to find a mapping such that G(x, s', c')→y.

To achieve this, in an embodiment, G is formulated as the generator network in the proposed SGGAN model. Meanwhile, such an embodiment employs a discriminator D and a segmentor S to supervise the training of the generator G. As following [Choi et al., "Stargan: Unified generative adversarial networks for multi-domain image-to-image translation," arXiv preprint arXiv:1711.09020, 2017], the discriminator D is developed with two different purposes to handle multi-attribute labels, such as D: x→{$D_a$,$D_c$}. In detail, $D_a$(•) outputs a single scalar that represents the probability of the given sample belonging to the target domain, and $D_c$(•) gives a vector of size (1×$n_c$) with each dimension being the probability of one specific attribute.

In order to guide the generator by the target segmentation information, an additional network is built which takes an image as input and generates the image's corresponding semantic segmentation. This network is referred to as the segmentor network S which is trained together with the GAN framework. When training with the real data pairs (x,s), S learns to estimate segmentation correctly. When S is trained together with G, the fake image denoted by G(x, s', c') is fed to S to obtain the image's estimated segmentation S(G(x, s', c')) which is compared with a target segmentation s' to calculate a segmentation loss. When optimizing G, with minimizing the segmentation loss providing gradient information, G tends to translate the input image to be consistent with s'. To better utilize the information in s', s' is annotated as a k-channel image where each pixel is represented by a one-hot vector indicating its class index. Then s' is concatenated to x in channel dimension before feeding into the generator. In summary, such an embodiment leverages semantic segmentation information in GAN based image translation tasks and also builds a segmentor which is trained together with the GAN framework to provide guidance in image translation.

Figure 4:
FIG. 4 portrays landmark and segmentor determined image segmentations that may be employed in embodiments.

Now that example detailed embodiments have been introduced, the following summarized description of the foregoing and alternative embodiments is provided, followed by a continued detailed description of the drawings in reference to FIG. 4.

An example embodiment is directed to a system for training an image generator. In an embodiment, the system comprises a processor and a memory with computer code instructions stored thereon, wherein the processor and the memory, with the computer code instructions, are configured to cause the system to provide a generator, discriminator, and segmentor. In an embodiment of the system, the generator is implemented with a first neural network configured to generate a fake image based on a target segmentation. A fake image is a processor-generated image, where the processor may be a neural network, and a target segmentation, according to an embodiment, is a set of segments, e.g., sets of pixels or set of contours, that correspond to portions or landmarks, e.g., eyes, nose, mouth etc., of an image. Further, in such an embodiment, the discriminator is implemented with a second neural network configured to distinguish a real image from a fake image and output a discrimination result as a function thereof, and the segmentor is implemented with a third neural network configured to generate a segmentation from the fake image. To train the generator, according to an embodiment, the generator outputs the fake image to the discriminator and the segmentor, and iterative operation of the generator, discriminator, and segmentor during a training period causes: the discriminator and generator to train in an adversarial relationship with each other and the generator and segmentor to train in a collaborative relationship with each other. In an embodiment, training in an adversarial relationship means that training one element, e.g., the discriminator, undermines, the training of the other element, and vice versa, and training in a collaborative relationship means that training one element, e.g., the generator, also enhances the training of another element, e.g., the segmentor, and vice versa. According to an embodiment, at the end of the training period, the generator has its first neural network trained to generate the fake image based on the target segmentation with more accuracy than at the start of the training period.

According to an embodiment of the system, the generator is further configured to generate the fake image based on the target segmentation and target attributes (e.g., hair color, skin tone, and shirt style, among others). In another embodiment, the generator is further configured to generate the fake image based on the target segmentation, the target attributes, and a real image, wherein a translated version is defined as a processor-generated version. In such an embodiment, a given fake image is a translated version of the real image. Further, in another embodiment, the generator is further configured to generate the fake image based on the target segmentation, the target attributes, and a latent vector. The latent vector may be a random vector sampled from a normal distribution.

An embodiment of the system implements the discriminator and generator to train in an adversarial relationship with each other by configuring the discriminator to output the discrimination result to an optimizer, wherein the optimizer is configured to: (i) adjust weights of the first neural network based on the discrimination result to improve generation of the fake image by the generator and (ii) adjust weights of the second neural network based on the discrimination result to improve distinguishing a real image from a fake image by the discriminator.

In an embodiment of the system, the first neural network includes: a down-sampling convolutional block configured to extract features of the target segmentation, a first concatenation block configured to concatenate the extracted features with a latent vector, an up-sampling block configured to construct a layout of the fake image using the concatenated extracted features and latent vector, a second concatenation block configured to concatenate the layout with an attribute label to generate a multidimensional matrix representing features of the fake image, and an up-sampling convolutional block configured to generate the fake image using the multidimensional matrix.

In embodiments, the fake image may be an image of a person, an image of a vehicle, or an image of a person in clothes, amongst other examples.

Another embodiment is directed to a method for training an image generator. An embodiment of the method comprises training: (i) a generator, implemented with a first neural network, to generate a fake image based on a target segmentation, (ii) a discriminator, implemented with a second neural network, to distinguish a real image from a fake image and output a discrimination result as a function thereof, and (iii) a segmentor, implemented with a third neural network, to generate a segmentation from the fake image. According to an embodiment, the training includes the generator outputting the fake image to the discriminator and the segmentor. Further, the training may include iteratively operating the generator, discriminator, and segmentor during a training period. The iterative operation causes the discriminator and generator to train in an adversarial relationship with each other and the generator and segmentor to train in a collaborative relationship with each other. In an embodiment, at the end of the training period, the generator's first neural network is trained to generate the fake image based on the target segmentation with more accuracy than at the start of the training period.

An embodiment of the method further comprises training the generator to generate the fake image based on the target segmentation and target attributes. Another embodiment includes training the generator to generate the fake image based on the target segmentation, the target attributes, and a real image. In such a method embodiment, a given fake image may be a translated version of the real image. Yet another embodiment of the method includes training the generator to generate the fake image based on the target segmentation, the target attributes, and a latent vector. According to an embodiment, the latent vector is a random vector sampled from a normal distribution.

In an embodiment, causing the discriminator and generator to train in an adversarial relationship with each other includes: causing the discriminator to output the discrimination result to an optimizer, and causing the optimizer to: (i) adjust weights of the first neural network based on the discrimination result to improve generation of the fake image by the generator and (ii) adjust weights of the second neural network based on the discrimination result to improve distinguishing a real image from a fake image by the discriminator. It should be understood that causing the elements to perform their function means that the processor is operating and the elements operate therein in accordance with their respective functions.

According to an embodiment, the generator, implemented with the first neural network, is trained to generate the fake image by: at a down-sampling convolutional block, extracting features of the target segmentation; at a first concatenation block, concatenating the extracted features with a latent vector; at an up-sampling block, constructing a layout of the fake image using the concatenated extracted features and latent vector; at a second concatenation block, concatenating the layout with an attribute label to generate a multidimensional matrix representing features of the fake image; and, at an up-sampling convolutional block, generating the fake image using the multidimensional matrix.

Yet another embodiment of the present invention is directed to a computer program product for training an image generator, wherein the computer program product comprises one or more non-transitory computer-readable storage devices and program instructions stored on at least one of the one or more storage devices. According to an embodiment, the program instructions, when loaded and executed by a processor, cause an apparatus associated with the processor to train: (i) a generator, implemented with a first neural network, to generate a fake image based on a target segmentation, (ii) a discriminator, implemented with a second neural network, to distinguish a real image from a fake image and output a discrimination result as a function thereof, and (iii) a segmentor, implemented with a third neural network, to generate a segmentation from the fake image. According to an embodiment of the computer program product, the training includes, by the generator, outputting the fake image to the discriminator and the segmentor. Further, in such an embodiment, the training further includes iteratively operating the generator, discriminator, and segmentor during a training period, wherein the iterative operation causes the discriminator and generator to train in an adversarial relationship with each other and the generator and segmentor to train in a collaborative relationship with each other. In such an embodiment, at the end of the training period, the generator has its first neural network trained to generate the fake image based on the target segmentation with more accuracy than at the start of the training period.

FIG. 4 depicts images and resulting segmentations that may be used in embodiments and/or generated by the segmentor S. In FIG. 4, the image 440 is depicted with the dotted lines 441 showing facial landmarks extracted from the image 440. The segmentation 442 is a landmark-based semantic segmentation. The image 443 is a real image sample that may be provided to a segmentor S implemented according to an embodiment to generate the segmentation 444.

Embodiments provide functionality to obtain semantic segmentations of face images and train the segmentor. For face images, as illustrated in FIG. 4, a great number of face alignment methods can be applied to extract the facial landmarks 441 from an input image 440. In an embodiment, extracted landmarks 441 are processed to generate a pixel-wised semantic segmentation 442 where each pixel in the input image 440 is automatically classified into classes of eyes, eyebrow, nose, lips, skin and background according to landmark information. During training of the segmentor S, S takes a real image sample 443 as input and generates an estimated segmentation 444. In an embodiment, the segmentor S is optimized by minimizing the difference between the landmark base segmentation 442 and segmentor generated segmentation 444. For instance, based upon differences between the landmark-based segmentation 442 and segmentor S generated segmentation 444, weights of the network implementing the segmentor S may be varied. As shown in FIG. 4, the similarity between the landmark-based segmentation 442 and segmentor generated segmentation 444 reveals that a segmentor network, implemented according to the embodiments described herein, can successfully capture the semantic information from an input image.

Based on the segmentor network S, the proposed SGGAN, e.g., the network depicted in FIG. 2D, comprises three networks, a segmentor, a generator, and a discriminator. The proposed SGGAN utilizes semantic segmentations as strong regulations and control signals in multi-domain image-to-image translation. Hereinbelow, the losses used to optimize the segmentor, generator, and discriminator networks are described and an overall objective of the network according to an embodiment is provided.

Segmentation Loss

To regulate the generated face image to comply with the target semantic segmentation, embodiments employ a segmentation loss which acts as an additional regulation and guides the generator G to generate target fake images. Taking a real image sample x as input, the generated segmentation S(x) is compared with the source segmentation s to optimize the segmentor S. The loss function is given by:

$$\mathcal{L}_{seg}^{real} = \mathbb{E}_{x,s}[A_s(s,S(x))], \quad (1)$$

Where $A_s(\bullet,\bullet)$ computes cross-entropy loss pixel-wisely by:

$$A_s(a, b) = -\sum_{i=1}^{H}\sum_{j=1}^{W}\sum_{k=1}^{n_s} a_{i,j,k} \log b_{i,j,k}, \quad (2)$$

with a and b being two segmentation maps of size (H×W× $n_s$).

In turn, in such an embodiment, to guide the generator to generate the desired target images, a generated fake image is fed into S to get a fake segmentation which is compared with the target segmentation input to the generator G. This fake segmentation loss can guide G to generate images that comply with the target segmentation. This loss can be defined as:

$$\mathcal{L}_{seg}^{fake} = \mathbb{E}_{x,s',c'}[A_s(s',S(G(x,s',c')))]. \quad (3)$$

Adversarial Loss

The image generation network, SGGAN, according to an embodiment, generates two types of images. The first image is the fake image generated by the generator G, e.g., the image 307, generated from the real image, the target segmentation, and target attributes denoted G(x, s', c'). The second image generated by the generator G is the reconstructed image, e.g., the image 317, generated from the fake image, source segmentation, and source attributes denoted by the label G(G(x, s', c'), s, c). An embodiment, adopts adversarial loss to the former path and thus, forms a generative adversarial network with the discriminator D. The later path reconstructs the input image in the source domain using the fake image, which can be trained with supervision using the input image that additional adversarial loss is unnecessary. The adversarial loss is defined as:

$$\mathcal{L}_{adv} = \mathbb{E}_x[\log D_a(x)] + \mathbb{E}_{x,s',c'}[\log(1-D_a(G(x,s',c')))]. \quad (4)$$

By optimizing the adversarial loss, the generator G tends to generate face images which cannot be distinguished from real images.

Classification Loss

In order to obtain attribute-level domain translation ability, embodiments implement an auxiliary attributes classifier $A_c$, which shares weights with D with the exception of the output layer. $A_c$ acts like a multi-class classifier which classifies the face image to the image's attributes labels. Objective functions associated with $A_c$ contain one loss with real image x to train the classifier, which is defined as $$\mathcal{L}_{cls}^{real} = \mathbb{E}_{x,c}[A_c(c,D_c(x))], \quad (5)$$

where $A_c(\bullet,\bullet)$ computes a multi-class cross-entropy loss by $$A_c(a,b) = -\Sigma_k a_k \log(b_k)$$

with a, b being two vectors of identical size $(1 \times n_c)$.

Accordingly, for generated images, the classification loss is given by $$\mathcal{L}_{cls}^{fake} = \mathbb{E}_{x,s',c'}[A_c(c',D_c(G(x,s',c')))]. \quad (6)$$

which enables the generator to transfer attribute-related contents from source to target domains.

Reconstruction Loss

An embodiment also implements a reconstructive loop which translates x into its corresponding target domain (s', c'), then translates the generated image G(x, s', c'), back into the source domain (s, c). This loss aims to keep the basic contents of x during image translation. In this path, the reconstructed image G(G(s', c'), s, c) should be as close as x. The reconstruction loss is then defined as $$\mathcal{L}_{rec} = \mathbb{E}_{x,s',c',s,c}[\|x - G(G(x,s',c'),s,c)\|_1]. \quad (7)$$

which tends to relate the result in the target domain to its original image and avoid mode collapse.

Overall Objective

According to an embodiment, the full objective function of the SGGAN network to optimize G, D, and S, is summarized as $$\mathcal{L}_S = \mathcal{L}_{seg}^{real}, \quad (8)$$

$$\mathcal{L}_D = -\mathcal{L}_{adv} + \lambda_1 \mathcal{L}_{cls}^{real}, \quad (9)$$

$$\mathcal{L}_G = \mathcal{L}_{adv} + \lambda_1 \mathcal{L}_{cls}^{fake} + \lambda_2 \mathcal{L}_{seg}^{fake} + \lambda_3 \mathcal{L}_{rec} \quad (10)$$

where $\lambda_1$, $\lambda_2$, and $\lambda_3$ are hyper-parameters which control the weights of classification loss, segmentation loss, and reconstruction loss. These weights act as relatively importance of those terms compared to adversarial loss. According to an embodiment, the weights are hyper-parameters chosen by user. The weights (hyper-parameters) can be tuned to affect how the generated images look. In an embodiment, the loss terms are constraints and regulations. In an embodiment, the generator will trade off those constraints (the loss terms) in generating the final output image. A larger hyper-parameter indicates a larger impact of that specific loss term. For example, increasing $\lambda_2$ will let the generated image be more consistent with the target segmentation. Since $A_c$ is embedded in D and shares the same weights except the output layer, $A_c$ is trained together with D using discriminator loss $\mathcal{L}_D$ which contains both the adversarial term and the classification term on real image samples.

In the training phase, a batch of (x, s, c) are samples from the real data distribution. Their target s' and c' are obtained by randomly shuffling s and c. The SGGAN can then be optimized using the objective functions. In a testing phase, when doing the attribute translation only, an embodiment uses the trained S to obtain the segmentation of the test image x as the target s' to keep the spatial contents unchanged. When the spatial translation is performed, according to an embodiment, any desired s' can be selected from the dataset. G can then align x to the target s'. In an embodiment, $\lambda_1 = 1$, $\lambda_2 = 10$, and $\lambda_3 = 5$ are used.

Hereinbelow, in relation to FIGS. 5-12, experimental results of embodiments are discussed. For the results, an embodiment of the SGGAN framework is compared with existing methods on two-domain and multi-domain face image-to-image translations. The results illustrate the capability of embodiments to transfer facial attributes and morph facial expressions with a single model.

To obtain the experimental results, the CelebA dataset [Liu et al., "Deep learning face attributes in the wild," In ICCV, 2015] was used which contains 202,599 face images of celebrities with 40 binary attribute labels such as gender, age, and hair color, which is ideal for the multi-domain translation task. In the experiment, the dataset was separated into training and testing data. The implementations used aligned images where the center region was cropped and resized to 128×128. A facial landmarks detector, Dlib [King, "Dlib-ml: A machine learning toolkit," *Journal of Machine Learning Research*, 10:1755-1758, 2009], was used to extract landmarks. Because the detector may fail and return invalid results, the failed detections were removed by comparing the detected 68-point landmarks with the ground-truth 5-point landmarks in data preprocessing. Based on extracted 68-point landmarks, semantic facial segmentations consisting of eyes, nose, mouth, skin, and background regions were generated.

Embodiments of the present invention were compared with several state-of the art methods such as the two-domain translation models CycleGAN [Zhu et al., "Unpaired image-to-image translation using cycle-consistent adversarial networks," arXiv preprint arXiv: 1703.10593, 2017] and UNIT [Liu et al., "Unsupervised image-to-image translation networks," arXiv preprint arXiv:1703.00848, 2017] and the multi-domain translation method StarGAN [Choi et al., "Stargan: Unified generative adversarial networks for multi-domain image-to-image translation," arXiv preprint arXiv: 1711.09020, 2017]. To obtain the experimental results, the models of these existing methods were trained and tuned using the models' officially released source code.

Table 1 below illustrates the network architecture for the embodiments of the present invention implemented to obtain the results discussed in relation to FIGS. 5-12. In Table 1, CONV refers to convolution layer, DCONV refers to transposed convolution layer, RESBLK refers to residual block, N refers to the number of filters, K refers to kernel size, S refers to stride, P refers to padding, IN refers to instance normalization, and 1RELU refers to leaky RELU activation.

1711.09020, 2017], which are hair color, gender, age, and the combinations of hair color, gender, and age.

Figure 5:
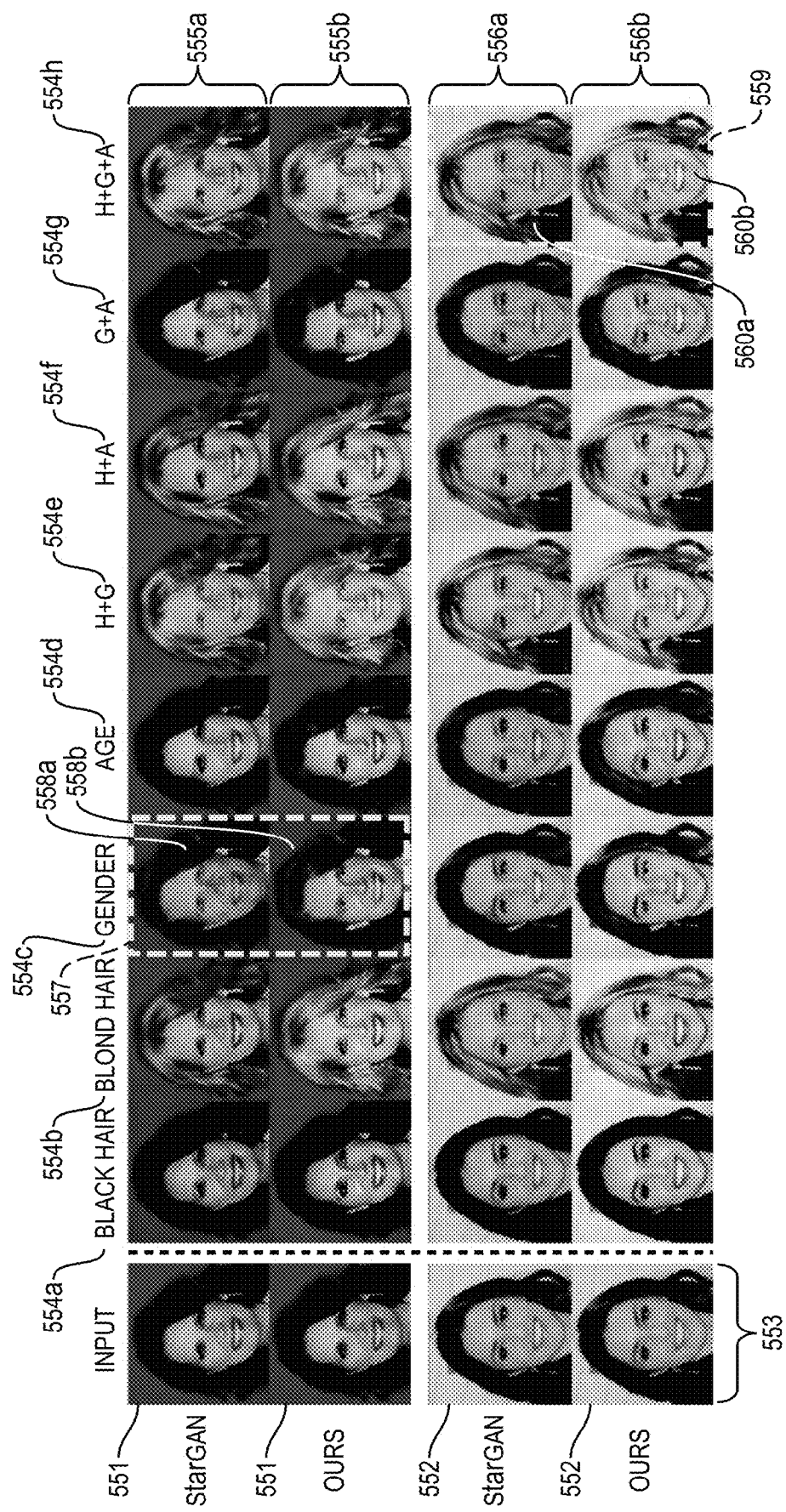
FIG. 5 depicts images generated using embodiments and an existing method.

FIG. 5 depicts the multiple facial attribute translation results generated using the existing StarGAN method and an embodiment of the present invention. The input images 551 and 552 are shown in the column 553. The input images 551 and 552 were translated to have the varying attributes 554*a-h* where H refers to hair color, G refers to gender, and A refers to age. The results from the StarGAN method using the input image 551 are shown in the row 555*a* and the results generated from an embodiment of the present invention using the input image 551 are shown in the row 555*b*. The results from the StarGAN method using the input image 552 are shown in the row 556*a* and the results generated from an embodiment of the present invention using the input image 552 are shown in the row 556*b*. The rectangle 557 highlights a major improvement of an embodiment of the present invention where the image 558*a* generated using the StarGAN method is of much lower quality than the image 558*b* generated according to an embodiment. Similarly, the rectangle 559 highlights a major improvement of an embodiment of the present invention where the image 560*a* generated using the StarGAN method is of much lower quality than the image 560*b* generated according to an embodiment.

As shown in FIG. 5, embodiments of the present invention generally produce much sharper and more realistic results with better contrast compared to those images generated using StarGAN. StarGAN does not perform well in transferring gender since the StarGAN results 555*a* and 556*a* appear vague, particularly in multi-attribute transfer tasks. Further, the StarGan results 555*a* and 556*a* introduce many unrealistic fake details in the eye and mouth regions, especially when transferring the face from young to old. StarGAN also suffers from a problem that gender-transfer-

| Architecture-A | Architecture-B |
|---|---|
| CONV-(N64, K7, S1, P3), IN, RELU | CONV-(N64, K4, S2, P1), IN, IRELU |
| CONV-(N128, K4, S2, P1), IN, RELU | CONV-(N128, K4, S2, P1), IN, IRELU |
| CONV-(N256, K4, S2, P1), IN, RELU | CONV-(N256, K4, S2, P1), IN, IRELU |
| RESBLK-(N256, K3, S1, P1), IN, RELU × k | CONV-(N512, K4, S2, P1), IN, IRELU |
| DCONV-(N128, K4, S2, P1), IN, RELU | CONV-(N1024, K4, S2, P1), IN, IRELU |
| DCONV-(N64, K4, S2, P1), IN, RELU | CONV-(N2048, K4, S2, P1), IN, IRELU |

Segmentor: Architecture-A + CONV-(Nn$_s$, K7, S1, P3)
Generator: Architecture-A + CONV-(N3, K7, S1, P3), TanH
Discriminator: Architecture-B + CONV-(N1, K3, S1, P1) & CONV-(Nn$_c$, K2, S1, P1)

A deep encoder-decoder architecture was employed for both G and D with several residual blocks to increase the depth of the network while avoiding gradient vanishing. For the discriminator network, state-of-the-art loss function and training procedures were adopted from improved WGAN with gradient penalty [Gulrajani et al., "Improved training of wasserstein gans," arXiv preprint arXiv:1704.00028, 2017], to stabilize the training process. In bottleneck layers, k=6 residual blocks were implemented for the generator G and k=4 residual blocks for the segmentor S. Three Adam optimizers were employed with beta1 of 0.5 and beta2 of 0.999 to optimize the networks. The learning rates were set to be 0.0001 for both G and D and 0.0002 for S.

For the multi-domain image translation task, embodiments of the invention, e.g., SGGAN, were trained on the CelebA dataset with both facial segmentations and attribute-level labels. For a fair comparison, the choice of attributes was followed as described by StarGAN [Choi et al., "Stargan: Unified generative adversarial networks for multi-domain image-to-image translation," arXiv preprint arXiv:

ring results are too neutral to be regarded as the target gender. This is because StarGAN does not use high-level information as guidance during generation. In contrast, because embodiments use semantic segmentation information, embodiments effectively transfer all the attributes and produce much sharper, clearer, and more realistic translation results. This clearly shows the superiority of embodiments over StarGAN.

Figure 6:
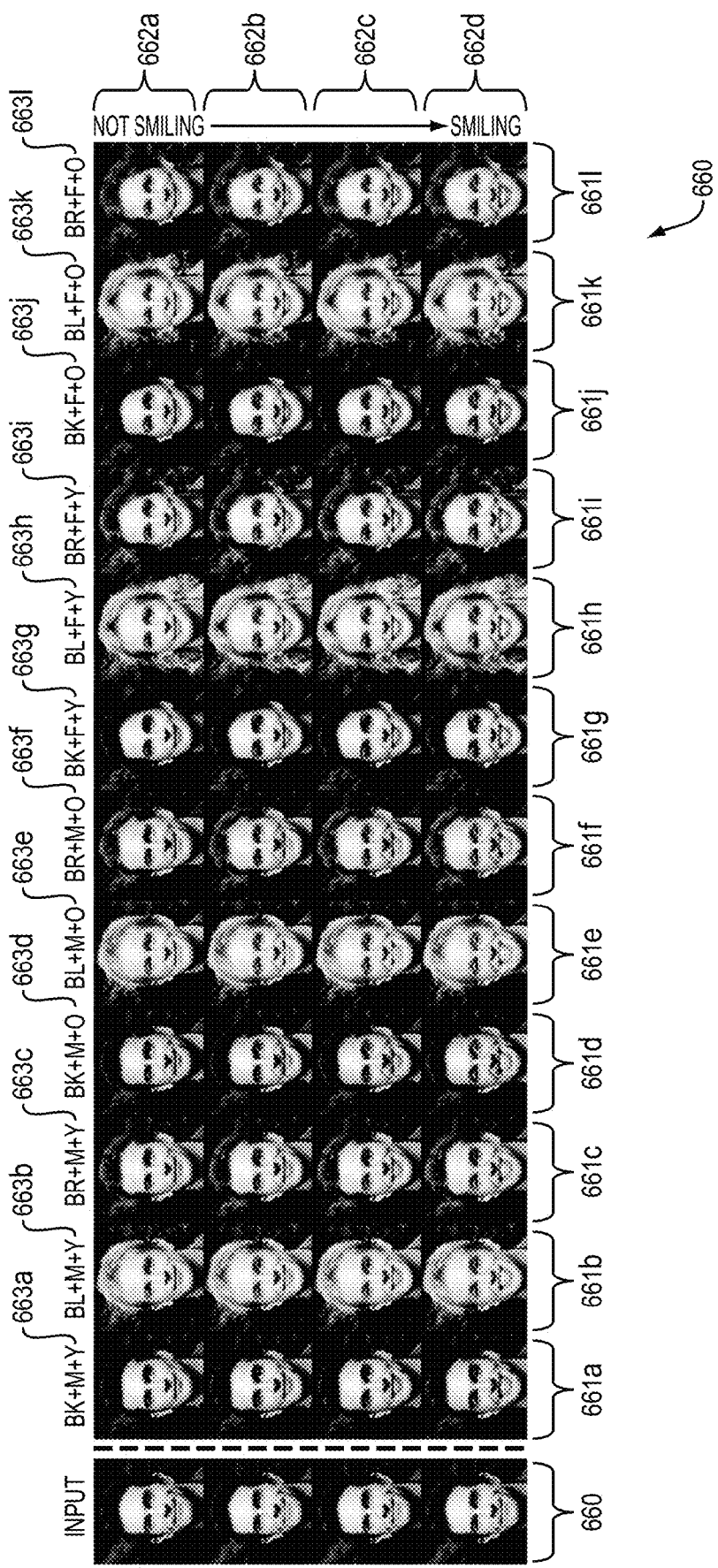
FIG. 6 illustrates images generated to have various attributes according to an embodiment.

FIG. 6 illustrates results of an embodiment implemented to perform multiple facial attribute translation together with expression morphing, a Nosmile2Smile interpolation, on the CelebA dataset. The column 660 shows the input images. The columns 661*a-l* show the results of the multi-attribute translation and each row 662*a-d* shows interpolation results from not smiling to smiling based on the multi-attribute translation results. In total, there are 12 kinds of target attributes 663*a-l* which are all combinations of selected attributes including hair colors, genders, and ages. In FIG. 6, BK refers to black hair, BL refers to blonde hair, BR refers to brown hair, M refers to male, F refers to female, Y refers to young, and O refers to old.

To obtain the results in FIG. 6, an embodiment of the SGGAN framework was trained with both segmentation and attribute information. As a result, there are two translating dimensions which are the attributes transfer and NoSmile2Smile interpolation. For attribute transfer, all possible combinations of selected attributes including hair color (black, blonde, or brown), gender (male or female) and age (young or old) were applied as the target attributes. For the NoSmile2Smile interpolation, four stage morphing segmentations between non-smiling faces and smiling faces were fed into the generator.

FIG. 6 demonstrates that networks used to implement embodiments of the segmentor, generator, and discriminator effectively transfer an input image into a realistic target image with specified attributes, warp the face according to a target segmentation, and gradually change facial expressions. FIG. 6 shows that introducing a strong regulation provided by facial landmarks based semantic segmentation which guides the generator in the generating process is effective for controlling the spatial contents of the translated face images.

Figure 7:
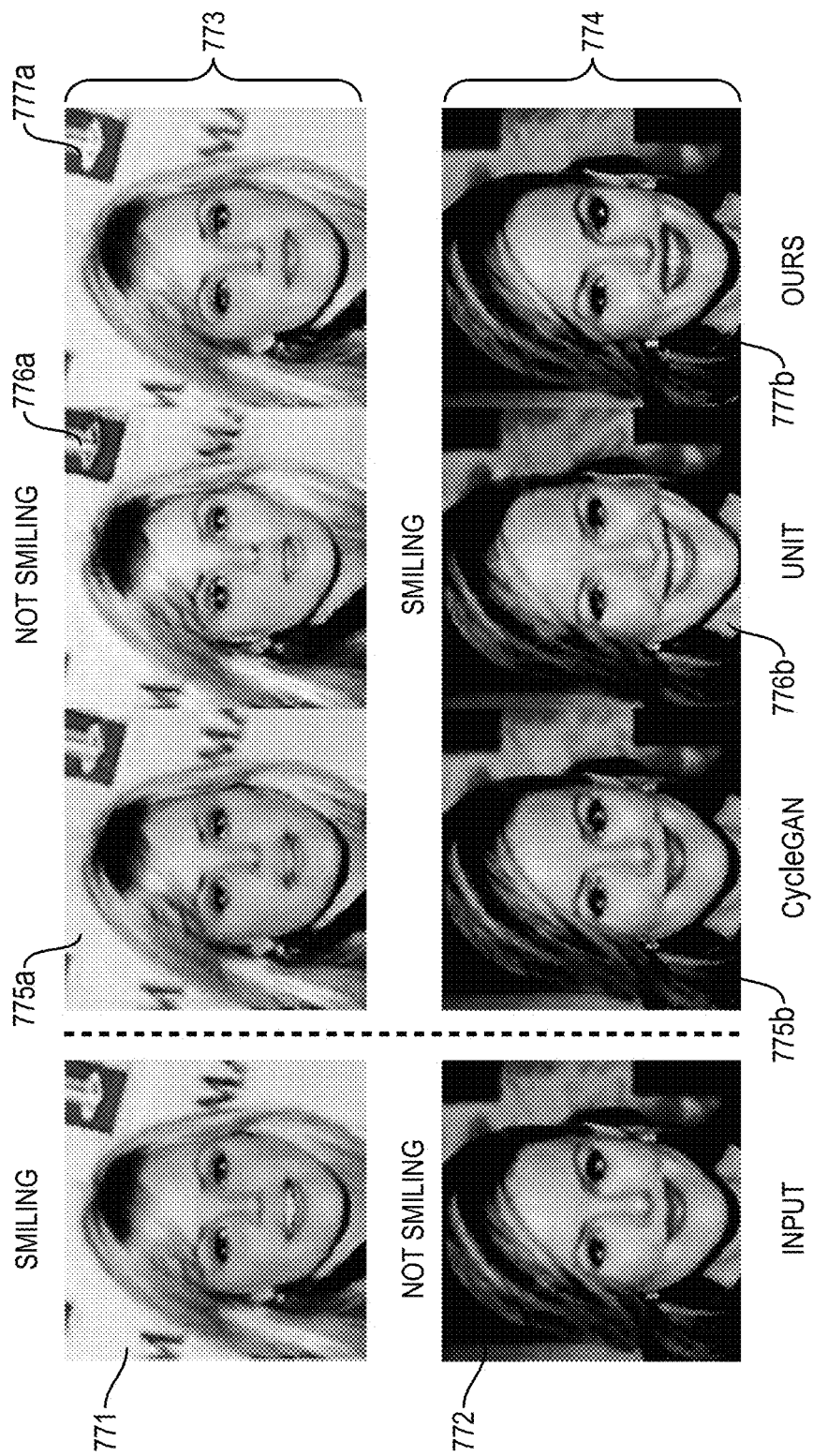
FIG. 7 compares images generated using embodiments and existing methods.

FIG. 7 compares the results of an embodiment with the two-domain translation methods CycleGAN [Zhu et al., "Unpaired image-to-image translation using cycle-consistent adversarial networks," arXiv preprint arXiv: 1703.10593, 2017] and UNIT [Liu et al., "Unsupervised image-to-image translation networks," arXiv preprint arXiv: 1703.00848, 2017]. To obtain the results in FIG. 7, the input images 771 and 772 were translated to transfer facial expressions bi-directionally between not smiling and smiling. In FIG. 7, the row 773 depicts the results of translating the smiling image 771 to not smiling and the row 774 shows the results of transferring the not smiling input image 772 to smiling. The images 775a-b illustrate the CycleGAN results, the images 776a-b illustrate the UNIT results, and the images 777a-b illustrate the results generated according to an embodiment.

To obtain the results in FIG. 7, the SGGAN framework was trained on the CelebA dataset with segmentation information but, without any attribute-level labels. CycleGAN and UNIT were trained on the CelebA dataset with two image subsets separated by smiling labels. As shown in FIG. 7, in the smiling-to-not-smiling direction (row 773), both UNIT's and CycleGAN's results, 775a and 776a, respectively, look like completely different persons with distorted face shapes and blurry details in the nose and mouth region which make their facial expressions strange. In the not-smiling-to-smiling direction (row 774), the result of CycleGAN 775b remains unchanged. This is likely a result of identity loss which tends to keep the small smile and disables the ability to further enlarge the smile. The UNIT results 776b show that UNIT successfully enlarged the smile, but introduced blurry details and fake texture and, thus, the result is of poor quality. In contrast, in both directions (rows 773 and 774), the results 777a-b from the embodiment of the present invention have sharp details and unchanged facial identities and the results are more natural and realistic.

Figure 8:
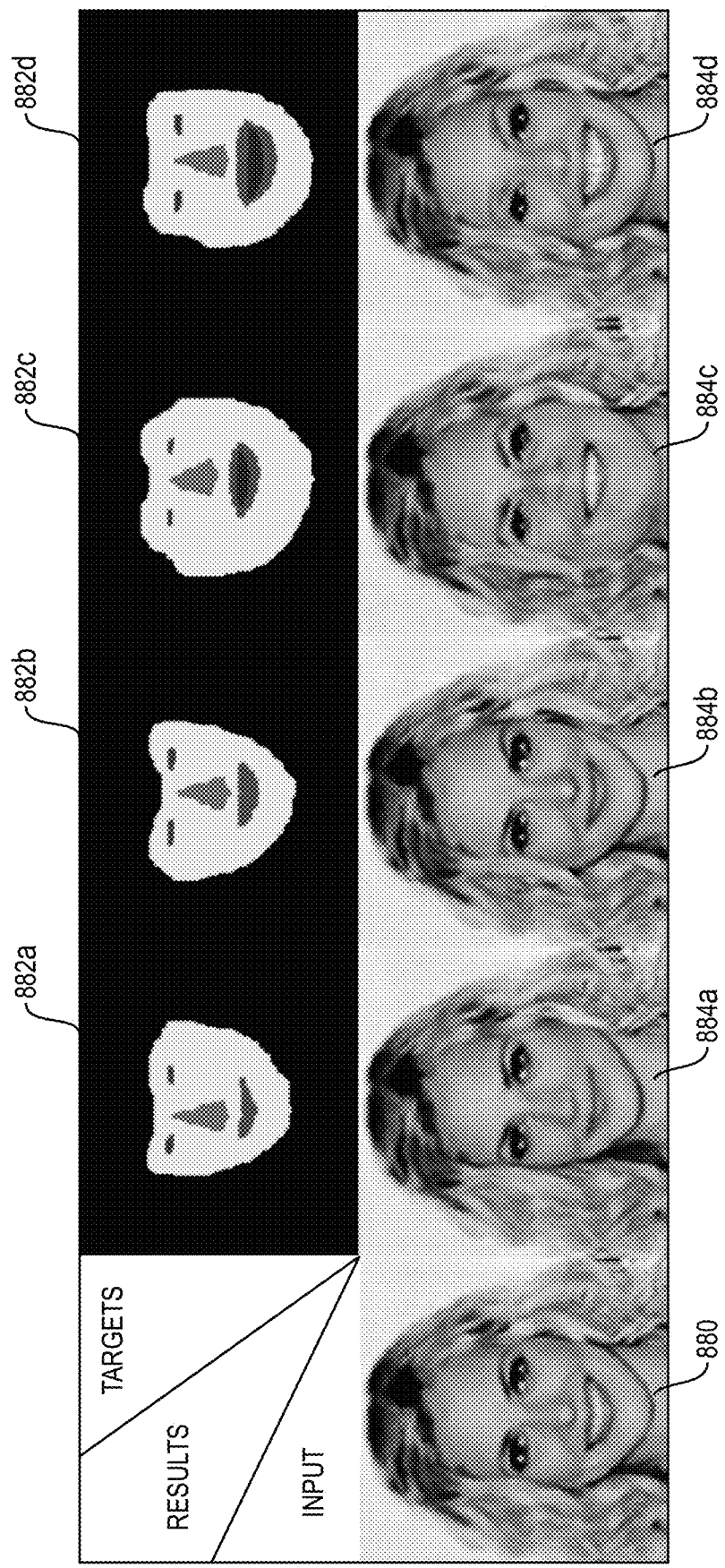
FIG. 8 illustrates results of facial morphing performed by an embodiment.

Embodiments of the invention also provide functionality to facially translate images. FIG. 8 depicts face morphing results generated using the input image 880. For the results 884a-d the target segmentations 882a-d were used with the input image 880 in an embodiment of the present invention.

To obtain the results in FIG. 8, an ablation study was implemented. In the ablation study, the auxiliary attribute classifier was removed from an embodiment of the SGGAN. In such an embodiment, the SGGAN is still capable of aligning the input images according to the target segmentations, which is referred to herein as face morphing. As shown in FIG. 8, when input a face image 880 with target segmentations 882a-d of any face shape, facial expression, and orientation, an embodiment of the present invention generates faces 884a-d with the target spatial configuration 882a-d, yet, the resulting images 884a-d, still share the same attributes with the input face image 880 such as gender, hair color, skin color, and background. This demonstrates the effectiveness of the guidance by the target segmentations 882a-d in such an embodiment.

Figure 9:
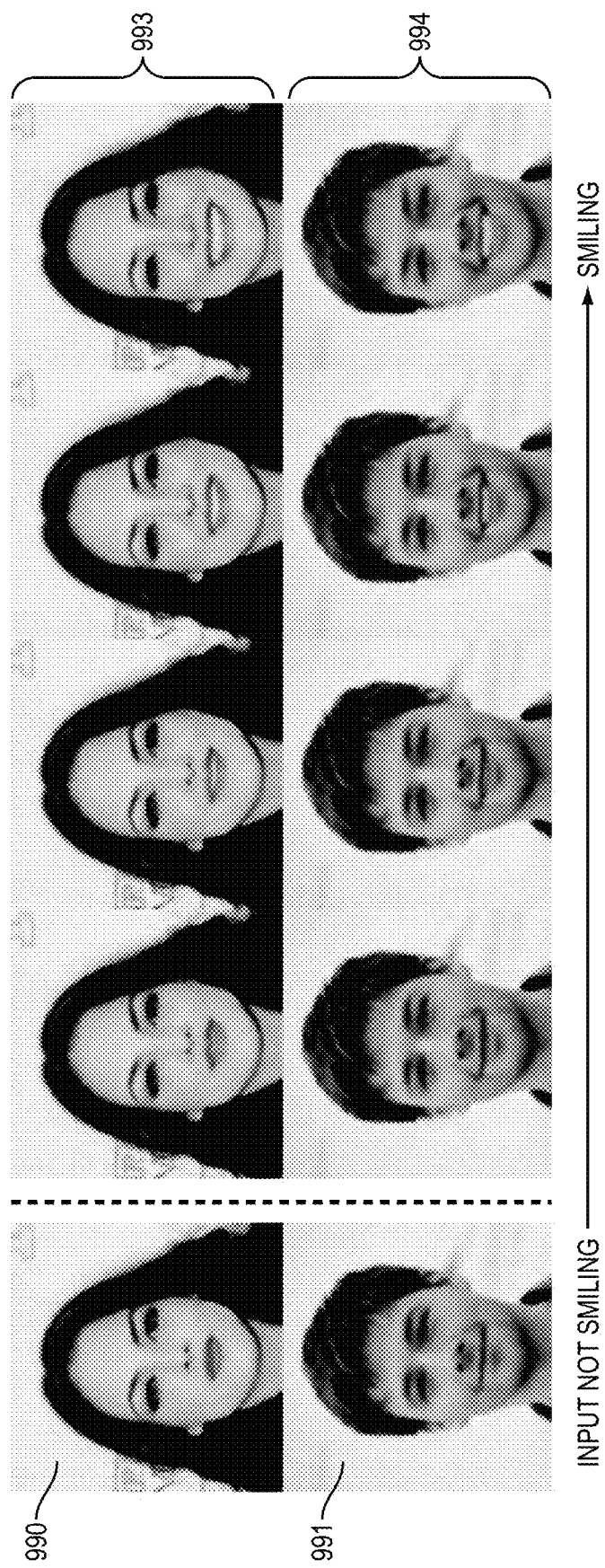
FIG. 9 depicts results of interpolation functionality performed by an embodiment.

Embodiments are also capable of providing interpolation capability. FIG. 9 depicts such functionality where a no smile to smile (NoSmile2Smile) interpolation is generated. The results in FIG. 9 were generated using the input images 990 and 991. The row 993 shows intermediate translated results between not smiling and smiling generated using the input image 990 and interpolating on landmarks in the image 990. The row 994 shows intermediate translated results between not smiling and smiling generated using the input image 991 and interpolating on landmarks in the image 991.

By interpolating facial landmark points from not-smiling landmarks to smiling landmarks and generating corresponding segmentations, embodiments of the present invention can generate images with expressions of intermediate stages between not smiling and smiling as shown in FIG. 9. All the results 993 and 994 have a good visual quality. Existing methods which are trained on binary attribute labels cannot achieve the same interpolation results.

Figure 10:
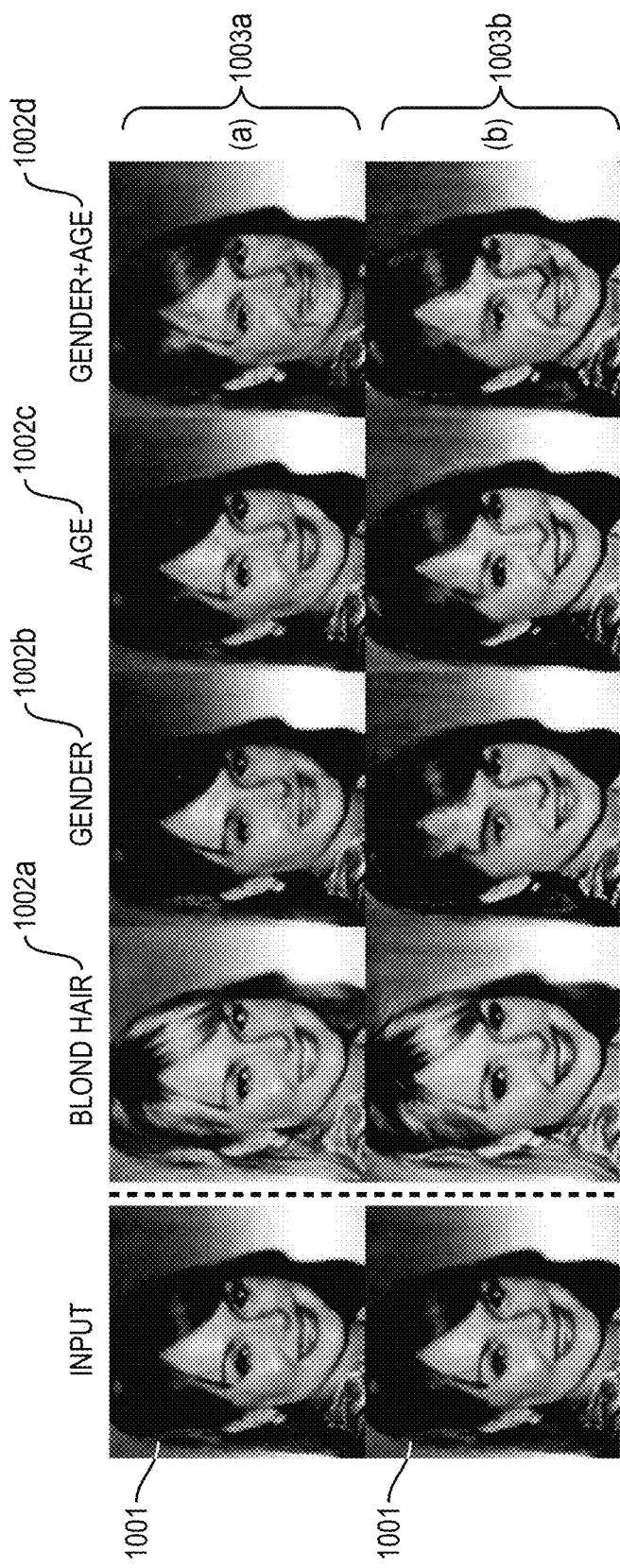
FIG. 10 shows an effect of a tuning procedure on image generation according to an embodiment.

FIG. 10 shows the results of a tuning analysis for tuning a hyper-parameter for reconstruction loss $\lambda_3$. In FIG. 10, the results were obtained using the input image 1001 in an embodiment of the SGGAN to generate the images in the rows 1003a-b with the attributes 1002a-d. The results in the row 1003a were obtained with $\lambda_3=20$ and the results in the row 1003b were obtained with $\lambda_3=1$.

Figure 11:
FIG. 11 shows an effect on image generation of a tuning procedure employed in embodiments.

FIG. 11 shows the results of a tuning analysis for tuning a hyper-parameter for segmentation loss $\lambda_2$. In FIG. 11, the results were obtained using the input image 1110 in an embodiment of the SGGAN to generate the images in the rows 1113a-b where hair and age translation with smile morphing was performed on the input image 1110. The results in the row 1113a were obtained with $\lambda_2=1$ and the results in the row 1113b were obtained with $\lambda_2=30$.

The additional results on hyper-parameter analysis illustrate the trade-off in parameter settings to provide higher-quality results. As shown in FIG. 10, increasing the weight of reconstruction loss (row 1003a) tends to blur the output image and generate lower-quality results, but, ensures the output images are more similar to the input image 1001. On the other side, as shown in FIG. 11, increasing the weight for segmentation loss (row 1113b) tends to produce sharper, more realistic images. However, increasing $\lambda_2$ (segmentation loss) too much produces faces with more makeup (look younger) in Young2Old translation. With lower $\lambda_2$, classification loss takes more effect and the generated results in the row 1113a appear older than the images in the row 1113b. In embodiments, these parameters can be tuned on demand.

Figure 12:
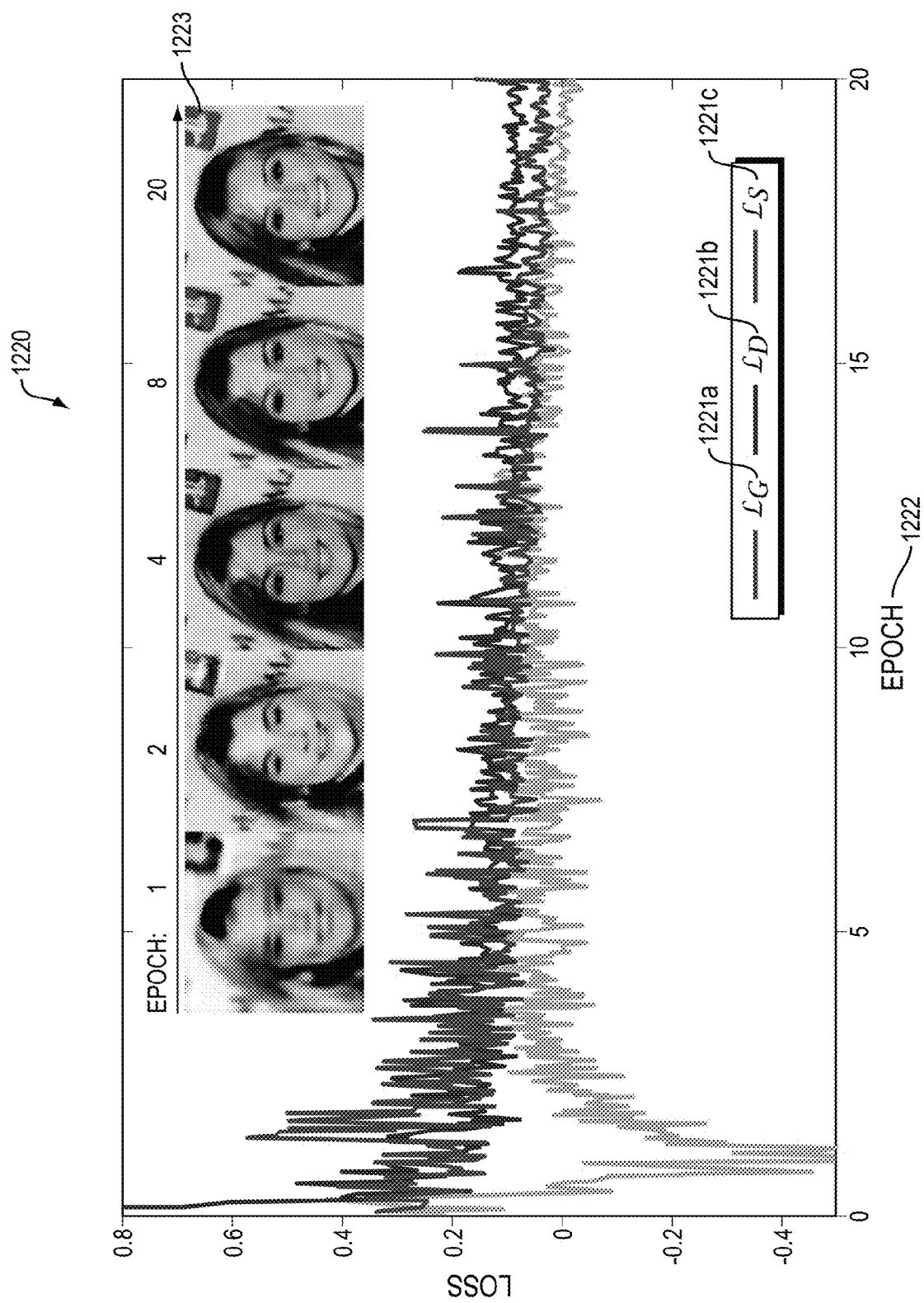
FIG. 12 is a plot depicting losses of a generator, discriminator, and segmentor employed in an embodiment.

FIG. 12 is a plot 1220 that demonstrates that embodiments of the SGGAN converge with the implemented segmentor and segmentation loss. In the plot 1220, the loss for the generator 1221a, the loss for the discriminator 1221b, and the loss for the segmentor 1221c are plotted versus epochs 1222 and the corresponding generated image results 1223 are plotted over the training period (epochs). FIG. 12 illustrates that the losses 1221a, 1221b, and 1221c for the generator, discriminator, and segmentor, respectively, converge and the image results 1223 improve continuously.

Embodiments improve multi-domain image translation through implementing the SGGAN. In the SGGAN, segmentation information is leveraged to provide strong regulations and guidance in image translation to avoid generating ghost images or images with blurry details. Moreover, this approach provides a spatial controllability, i.e., face morphing as an additional feature, which can align the input face images to the target segmentations and interpolate the intermediate faces from smiling to not smiling. Experimental results demonstrate that the proposed SGGAN framework is effective in face image translation applications.

An example embodiment of the invention may be applied to the multi-domain image-to-image translation task using a novel deep learning based adversarial network. In particular, an example embodiment invention may transfer facial attributes (e.g., hair color, gender, age) as well as morph facial expressions and change facial attribute arrangement and face shapes. Embodiments provide sharper and more realistic results with additional morphable features.

An embodiment may transfer facial attributes such as hair color, gender, and age. Using embodiments, facial attributes can be reallocated and face shapes can be modified during the translation process. An embodiment may also provide the controllability of changing facial expressions such as making a person smile gradually and generate a multi-frame video. An embodiment may generate attribute-level semantic segmentations from input faces. Generated semantic information may be used together with input images to guide face image translation processes.

Embodiments generate more realistic results with better image quality (sharper and clearer details) after image translation. Additional morphing features (face attribute reallocation, changing face shape, making a person gradually smile) may be provided in the translation process and no known existing methods can achieve the same effects. An embodiment can generate facial semantic segmentations directly from given input face images when, in contrast, traditional methods achieve this functionality by converting the results from a pre-trained face landmark detector.

Embodiments may be applied in many interesting face applications for entertainment that enable people to change the attributes of their faces, such as changing hair color, gender, or their age using an uploaded photo. Additional applications for embodiments include automatic criminal sketch and forensic tools, human tracking, and missing children verification and recognition.

An embodiment of the invention detects faces from the input image and extracts corresponding semantic segmentations. Then, an image translation process uses trained models of a novel deep learning based adversarial network, referred to herein as Segmentation Guided Generative Adversarial Networks, which fully leverages semantic segmentation information to guide the image translation process. An example benefit of embodiments includes explicitly guiding the generator with pixel-wise and instance level segmentations, and, thus, further boosting the image quality. Another benefit is the semantic segmentation working well prior to the image generation, which is able to edit the image content. Thus, embodiments can simultaneously change facial attributes and achieve expression morphing without giving extra expression labels. In detail, the proposed SGGAN model may employ three networks, i.e., generator, discriminator, and segmentor. The generator takes as inputs, a given image, multiple attributes, and a target segmentation and generates a target image. The discriminator pushes the generated images towards a target domain distribution, and meanwhile, utilizes an auxiliary attribute classifier to enable the SGGAN to generate images with multiple attributes. The segmentor may impose semantic information on the generation process. This framework is trained using a large dataset of face images with attribute-level labels. Further, it is noted that embodiments may implement segmentations of any desired features, e.g., features of faces, clothes, street views, cityscapes, room layouts, room designs, and building designs, amongst other examples.

In relation to FIGS. 1-12, embodiments of the present invention and features thereof are described where image generation is implemented through translating an input image based upon a target segmentation. However, embodiments of the invention are not limited to generating images using an input image, and hereinbelow, embodiments and features thereof are described that generate, i.e., synthesize images, without relying upon an input image.

Image generation has raised tremendous attention in both academic and industrial areas, especially for conditional and target oriented image generation, such as, criminal portrait and fashion design. Although current studies have achieved preliminary results along this direction, existing methods focus on class labels where spatial contents are randomly generated from a latent vector, and edge details or spatial information is blurred or difficult to preserve. In light of this, an embodiment of the present invention implements a novel Spatially Constrained Generative Adversarial Network (SC-GAN) that decouples the spatial constraints from the latent vector and makes them available as additional control signals. In an embodiment, to enhance the spatial controllability, a generator network is implemented to take a semantic segmentation, a latent vector, and an attribute-level label as inputs step by step. In addition, an embodiment of the SCGAN implements a segmentor network constructed to impose spatial constraints on the generator. Results described below experimentally demonstrate that the SCGAN framework is capable of controlling the spatial contents of generated images such as face shape, facial expression, face orientation, and fashion layout by providing both visual and quantitative results using the CelebA and DeepFashion datasets.

The success of Generative Adversarial Networks (GAN) [Goodfellow et al., "Generative adversarial nets," In NIPS (2014)] has increased the trend of photo-realistic image synthesis [Wang et al., "High-Resolution Image Synthesis and Semantic Manipulation with Conditional GANs," arXiv preprint arXiv:1711.11585 (2017); Zhang et al., "Stackgan++: Realistic image synthesis with stacked generative adversarial networks," arXiv preprint arXiv:1710.10916 (2017); Zhao et al., "Stylized Adversarial AutoEncoder for Image Generation," In ACM Multimedia Conference (2017)], where a generator network produces artificial samples to mimic real samples from a given dataset and a discriminator network attempts to distinguish between the real samples and artificial samples. These two networks are trained adversarially to achieve a generator that is capable of mapping a latent vector from a simple distribution to the real data samples from a complex distribution. GANs have been used in applications such as natural language processing [Kusner et al., "Gans for sequences of discrete elements with the gumbel-softmax distribution," arXiv preprint arXiv: 1611.04051 (2016); Li et al., "Adversarial learning for neural dialogue generation," arXiv preprint arXiv: 1701.06547 (2017); Yu et al., "SeqG AN: Sequence Generative Adversarial Nets with Policy Gradient," In AAAI. (2017); Zhang et al., "Generating text via adversarial training," In NIPS workshop on Adversarial Training (2016)], image super-resolution [Ledig et al., "Photo-realistic single image super-resolution using a generative adversarial network," arXiv preprint (2016); Liu et al., "Beyond Human-level License Plate Super-resolution with Progressive Vehicle Search and Domain Priori GAN," In ACM Multimedia Conference (2017)], domain adaptation [Bousmalis et al., "Unsupervised pixel-level domain adaptation with generative adversarial networks," In CVPR. (2017); Hoffman et al., Fcns in the wild: Pixel-level adversarial and constraint-based adaptation," arXiv preprint arXiv:1612.02649 (2016)], object detection [Li et al., "Perceptual generative adversarial networks for small object detection," In CVPR (2017)], activity recognition [Li et al., "Region-based Activity Recognition Using Conditional GAN," In ACM Multimedia Conference (2017)], video prediction [Mathieu et al., "Deep multi-scale video prediction beyond mean square error," arXiv preprint arXiv:1511.05440 (2015)], face aging [Liu et al., "Face Aging with Contextual Generative Adversarial Nets," In ACM Multimedia Conference (2017)], semantic segmentation [Luc et al., "Semantic Segmentation using Adversarial Networks," In NIPS Workshop on Adversarial Training (2016); Moeskops et al., "Adversarial training and dilated convolutions for brain Mill segmentation," In Deep Learning in Medical Image Analysis and Multimodal Learning for Clinical Decision Support (2017); Zhu et al., "Adversarial deep structural networks for mammographic mass segmentation," arXiv preprint arXiv:1612.05970 (2016)] and image-to-image translations [Isola et al., "Image-to-image translation with conditional adversarial networks," arXiv preprint arXiv:1611.07004 (2016); Kim et al., Learning to discover cross-domain relations with generative adversarial networks," arXiv preprint arXiv: 1703.05192 (2017); Liu et al., "Unsupervised image-to-image translation networks," In NIPS (2017); Yi et al. "DualGAN: Unsupervised Dual Learning for Image-to-Image Translation," arXiv preprint arXiv:1704.02510 (2017); Zhu et al., "Unpaired image-to-image translation using cycle-consistent adversarial networks," arXiv preprint arXiv:1703.10593 (2017)].

Beyond generating arbitrary style images, conditional and target-oriented image generation is highly needed for various practical scenarios, such as criminal portraits based on a victim's descriptions, clothing design with certain fashion elements, data augmentation, and artificial intelligence imagination. Although current studies have achieved preliminary results along this direction, existing methods focus on class labels where spatial contents are randomly generated from a latent vector, and edge details or boundary information is usually blurred or difficult to preserve. For example, Pix2Pix [Isola et al., "Image-to-image translation with conditional adversarial networks," arXiv preprint arXiv:1611.07004 (2016)] struggles to preserve the spatial information and sometimes generates "ghost faces." ACGAN [Odena et al., "Conditional image synthesis with auxiliary classifier gans," arXiv preprint arXiv:1610.09585 (2016)] guides the image generation with the auxiliary class labels or attributes; however, these semantic attributes cannot reflect the spatial information, which leads to generating low-quality images. Therefore, the spatial information is crucial to provide high-quality images and increase the model controllability for diverse generation.

In light of this, embodiments implement image generation with spatial constraints. An example embodiment implements a novel Spatially Constrained Generative Adversarial Network (SCGAN), which decouples the spatial constraints from the latent vector and makes them available as additional control signal inputs. An embodiment of the SCGAN includes a generator network, a discriminator network with an auxiliary classifier, and a segmentor network, which are trained together adversarially. In an embodiment, the generator is specially designed to take a semantic segmentation, a latent vector, and an attribute label as inputs step by step to synthesize a fake image. According to an example embodiment, the discriminator network is configured to distinguish between real images and generated images as well as classify images into attributes. The discrimination and classification results may guide the generator to synthesize realistic images with correct target attributes. The segmentor network, according to an embodiment, attempts to determine semantic segmentations on both real images and fake images to deliver estimated segmentations to guide the generator in synthesizing spatially constrained images. With those networks, embodiments implementing the SCGAN generate realistic images guided by semantic segmentations and attribute labels. This enables numerous applications such as Left2Right and NoSmile2Smile.

Another embodiment of the SCGAN has both spatial and attribute-level controllability, with a segmentor network that guides the generator network with spatial information, and increases the model stability for convergence. In another embodiment, to avoid foreground-background mismatch, the generator network is configured to first, extract spatial information from an input segmentation, second, concatenate that latent vector to provide variations, and third, use attribute labels to synthesize attribute-specific contents in the generated image. Extensive experiments on the CelebA and DeepFashion datasets, described herein, demonstrate the superiority of embodiments of the proposed SCGAN over the state-of-the-art GAN based methods and image-to-image translation methods in terms of both visual quality and controllability.

In recent years, deep generative models inspired by GAN [Goodfellow et al., "Generative adversarial nets," In NIPS (2014)] have enabled computers to imagine new samples based on knowledge learned from the given datasets. There are many variations of GAN to improve the ability of GAN to generate images. DCGAN [Radford et al., "Unsupervised representation learning with deep convolutional generative adversarial networks," arXiv preprint arXiv:1511.06434 (2015)] provides a general network architecture for image synthesis. InfoGAN [Chen et al., "Infogan: Interpretable representation learning by information maximizing generative adversarial nets," In NIPS. (2016)] learns an interpretable representation in latent vector. BEGAN [Berthelot et al., "Began: Boundary equilibrium generative adversarial networks. arXiv preprint arXiv:1703.10717 (2017)] leverages an autoencoder-like discriminator to eliminate artifacts. WGAN [Arjovsky et al., "Wasserstein gan," arXiv preprint arXiv:1701.07875 (2017)] introduces Wasserstein distance to solve training difficulties and mode-collapse of GAN, which improves the visual quality and variations of generation. WGAN is further improved by adding a gradient penalty term in optimizing the discriminator [Gulrajani et al., "Improved training of wasserstein gans," arXiv preprint arXiv:1704.00028 (2017)]. CoupleGAN [Liu et al., "Coupled generative adversarial networks," In NIPS. (2016)] couples two GANs with shared weights to generate paired image samples. A normalization method called spectrum normalization is introduced by [Miyato et al., "Spectral Normalization for Generative Adversarial Networks," In ICLR. (2018)] to further stabilize the GAN training. AmbientGAN [Bora et al., "AmbientGAN: Generative models from lossy measurements," In ICLR (2018)] tries to solve the lossy measurement problem by adding a measurement function to the GAN framework. Most recently, PGGAN [Karras et al., "Progressive growing of gans for improved quality, stability, and variation," arXiv preprint arXiv:1710.10196 (2017)] utilizes a progressive growing training strategy to generate high-resolution images which achieves state-of-the-art visual quality.

Researchers have focused on making target-oriented generative models instead of random generation models. Conditional GAN [Mirza et al., "Conditional generative adversarial nets," arXiv preprint arXiv:1411.1784 (2014)] is the first to input conditional labels into both a generator and a discriminator to achieve conditional image generation. Similarly, ACGAN [Odena et al., "Conditional image synthesis with auxiliary classifier gans," arXiv preprint arXiv:1610.09585 (2016)] constructs an auxiliary classifier within the discriminator to output classification results and Triple-GAN [Li et al., "Triple Generative Adversarial Nets," arXiv preprint arXiv:1703.02291 (2017)] introduces a classifier network as an extra player to the original two player setting. CasualGAN [Kocaoglu et al., "CausalGAN: Learning Causal Implicit Generative Models with Adversarial Training," In ICLR. (2018)] tends to make conditional GAN more creative by allowing sampling from interventional distributions. However, these existing methods focus on attribute-level conditions and neglect spatial-level conditions in their conditional generation.

For GAN based image-to-image translation methods, the input images can be regarded as spatial conditions in image translation. An image-to-image translation network called Pix2Pix is proposed in [Isola et al., "Image-to-image translation with conditional adversarial networks," arXiv preprint arXiv:1611.07004 (2016)], which uses an image as conditional input and trains the networks in a supervised manner with paired image data. The Pix2Pix method can generate realistic street view images based on semantic segmentation. It has been identified that paired training is not necessary after introducing a cycle-consistency loss and methods have implemented unpaired image-to-image translation methods [Kim et al., "Learning to discover cross-domain relations with generative adversarial network," arXiv preprint arXiv:1703.05192 (2017); Liu et al., "Unsupervised image-to-image translation networks," In NIPS (2017); Yi et al., "DualGAN: Unsupervised Dual Learning for Image-to-Image Translation," arXiv preprint arXiv:1704.02510 (2017); Zhu et al., "Unpaired image-to-image translation using cycle-consistent adversarial networks," arXiv preprint arXiv:1703.10593 (2017)]. Based on those two-domain translation methods, StarGAN [Choi et al., "StarGAN: Unified Generative Adversarial Networks for Multi-Domain Image-to-Image Translation," arXiv preprint arXiv:1711.09020 (2017)] proposes a multi-domain image translation network by utilizing an auxiliary classifier. However, the above mentioned existing approaches have an intrinsic assumption of one-to-one mapping between image domains, which may not hold for many one-to-many tasks. Moreover, these existing methods are only capable of generating fixed images without any variation.

In contrast to the existing methods, embodiments of the present invention provide a SCGAN that takes latent vectors, attribute labels, and semantic segmentations as inputs, and decouples the image generation into three dimensions. As such, embodiments of the SCGAN are capable of generating images with controlled spatial contents and attributes and generate target images with a large diversity.

Hereinbelow, a problem formulation, details of the structures of an embodiment of the SCGAN framework, loss functions associated with networks in the SCGAN framework, and details of a training procedure for the SCGAN framework, according to an embodiment are described.

Embodiments provide image generation that synthesizes realistic images which cannot be distinguished from the real images of a given target dataset. Embodiments employ spatial constraints in generating high-quality images with target-oriented controllability.

In an embodiment, $\mathbb{P}$ (x, c, s) denotes the joint distribution of a target dataset, where x is a real image sample of size (H×W×3) with H and W as the height and width of x, c is its attribute label of size (1×$n_c$) with $n_c$ as the number of attributes, and s is its semantic segmentation of size (H×W× $n_s$) with $n_s$ as the number of segmentation classes. Each pixel in s is represented by a one-hot vector with dimension $n_s$, which codes the semantic index of that pixel. According to an embodiment, the problem is defined as G (z, c, s)→y, where G(•, •, •) is the generating function, z is the latent vector of size (1×$n_z$), c defines the target attributes, s acts as a high-level and pixel-wise spatial constraint, and y is the conditionally generated image which complies with the target c and s. In an embodiment, the joint distribution of $\mathbb{P}$ (y, c, s) should follow the same distribution as $\mathbb{P}$ (x, c, s).

Figure 13:
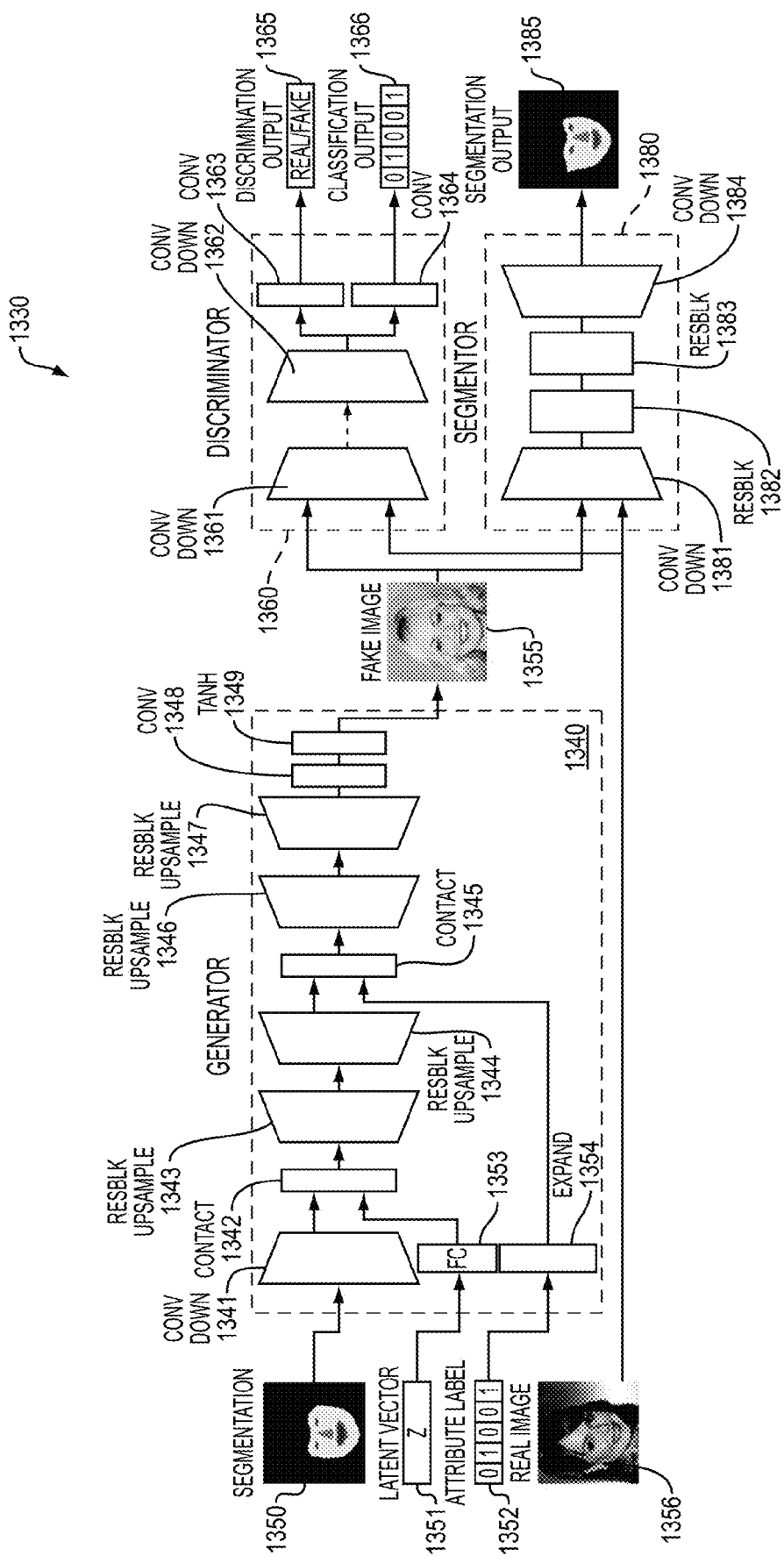
FIG. 13 is a simplified block diagram of a system for generating an image according to an embodiment.

FIG. 13 illustrates an embodiment of the SCGAN 1330. The SCGAN 1330 comprises three networks, a generator network G 1340, a discriminator network D 1360 with auxiliary classifier, and a segmentor network S 1380 which are trained together. The generator 1340 is designed such that a semantic segmentation, a latent vector, and an attribute label are input to the generator 1340 step by step to generate a fake image. The discriminator takes either fake or real images as input and outputs a discrimination result and a classification result. Similar to the discriminator 1360, the segmentor 1380 takes either a fake or real image as input and outputs a segmentation result which is compared to the ground-truth segmentation to calculate segmentation loss, which guides the generator to synthesize fake images that comply with the input segmentation.

The generator network 1340 is formed of the convolutional down-sampling block 1341, concatenation block 1342, up-sampling blocks 1343 and 1344, concatenation block 1345, up-sampling blocks 1346 and 1347, convolutional block 1348, and tan-h block 1349. Further, it is noted that the blocks 1341-1349 may be implemented together or separately in any combination, and the generator 1340 may be implemented with any number of blocks.

The generator network G 1340, according to an embodiment, is used to match a target mapping function. The generator 1340 takes three inputs which are z (latent vector 1351), c (attribute label 1352), and s (segmentation 1350). As shown in FIG. 13, the inputs 1350, 1351, and 1352 are fed into the generator 1340 one by one. First, the generator G 1340 takes s 1350 as input and extracts spatial information contained in s by several down-sampling convolutional layers (depicted as the block 1341). Next, the convolution result is concatenated, by the block 1342) with the latent code z 1351 after the latent code passes through the fully-connected neural network layer (FC) block 1353. In turn, the concatenation result is passed through residual up-sampling blocks 1343 and 1344 to construct the basic structure of the output image and attribute label c 1352 is fed into the generator 1340 through the expand block 1354 to guide the generator 1340 to generate attribute-specific images which share the similar basic image contents generated from s 1350 and z 1351. According to an embodiment, the expand block 1354 performs an expand operation to an input vector (attribute label 1352) by repeating the vector 1352 to the same width and height as a reference vector (the output of the block 1344). In such an embodiment, the expansion allows the vectors to be concatenated at the block 1345. The attribute label c 1352 is concatenated at block 1345 with the basic structure from the up-sampling blocks 1343 and 1344, to generate a multidimensional matrix representing features of the image being generated. Then, the multidimensional matrix is processed through the up-sampling convolutional blocks 1346 and 1347, convolutional block 1348, and tan-h block 1349 to generate the image 1355.

The discriminator D 1360 is implemented with the convolutional down-sampling blocks 1361 and 1362 and convolutional blocks 1363 and 1364. To obtain realistic results which are difficult to distinguish from original data x (e.g., a real image 1356), the discriminator network D 1360 is implemented to form a GAN framework with the generator G 1340. In addition, an auxiliary classifier is embedded in D 1360 to determine a multi-label classification 1366 which provides attribute-level and domain-specific information back to the generator G 1340. D 1360 is defined as D: $x \rightarrow \{D_d(x), D_c(x)\}$, where $D_d(x)$ gives the probability 1365 of x (an input image such as the real image 1356 or generated image 1355) belonging to the real data distribution and $D_c(x)$ outputs the probabilities 1366 of x belonging to $n_c$ attribute-level domains.

According to an embodiment, the segmentor neural network 1380 is implemented with a convolutional down-sampling block 1381, residual blocks 1382 and 1383 (which may be implemented similarly to residual blocks described herein), and up-sampling convolutional block 1384. The segmentor network 1380 implemented with the blocks 1381-1384 is configured to receive an input image such as the generated image 1355 or real image 1356 and generate a segmentation 1385 of the input image. According to an embodiment, the segmentor network S 1380 is trained together with the generator G 1340 and discriminator D 1360 to provide spatial constraints in conditional image generation. In an embodiment, S(•) is the mapping function. S takes a sample of real data, e.g., the image 1356, or generated data, e.g., the image 1355, as input and outputs S(•) which represents pixel-wise probabilities of belonging to the $n_s$ semantic segments.

Figure 14:
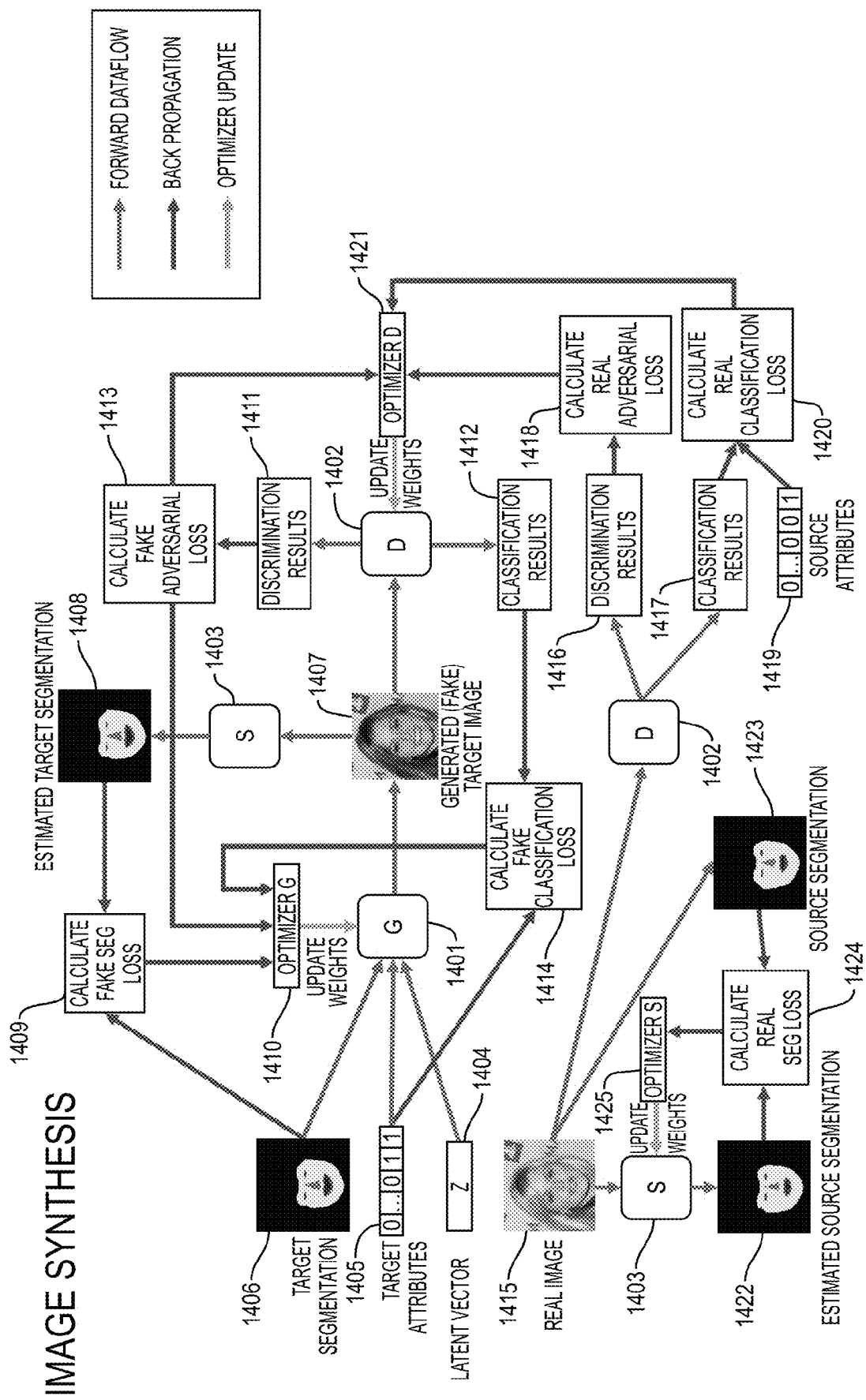
FIG. 14 is a block diagram depicting a procedure for training an image generator according to an embodiment.

FIG. 14 illustrates a process of training an image generator that comprises the generator 1401, discriminator 1402, and segmentor 1403. The generator 1401 is configured to receive three inputs, a latent vector 1404 sampled from a normal distribution, a target segmentation 1406, and a vector of target attributes 1405. A goal of the generator 1401 is to synthesize diverse generated images, i.e., fake images, that comply with the target segmentation 1406 and target attributes 1405.

During the training process, the three inputs (target segmentation 1406, target attributes 1405, and latent vector 1404) are fed into the generator 1401 to obtain a generated image 1407. There are two paths after generating the image 1407. The first path is to input the generated image 1407 to the segmentor 1403. The segmentor 1403 estimates a semantic segmentation 1408 from the generated image 1407 and the estimated segmentation 1408 is then compared with the target segmentation 1406 to calculate a fake segmentation loss 1409. The fake segmentation loss 1409 is fed to the optimizer 1410. The second path feeds the generated image 1407 to the discriminator 1402 which generates a discrimination output 1411 and a classification output 1412. The discrimination output 1411 is used to calculate the fake adversarial loss term 1413, and the classification output 1412 is used to calculate a fake classification loss 1414. The fake adversarial loss term 1413, the fake classification loss 1414, and the fake segmentation loss 1409 are all provided to the optimizer 1410 to optimize the generator 1401. In an embodiment, the loses 1410, 1413, and 1414 are summed up with weights as the generator loss and the generator loss is used by the optimizer 1410 to do back-propagation and update parameters in a neural network implementing the generator 1401. It is noted that while multiple optimizers are depicted, e.g., the optimizes 1410, 1421, and 1425, embodiments may utilize any number of optimizers to implement the training procedures described herein.

To train the discriminator 1402, an input source image 1415 is fed to the discriminator 1402 which generates a discrimination result 1416 and classification result 1417. The discriminator result 1416 is used to calculate a real adversarial loss term 1418, and the classification result 1417 is compared with the real source attribute 1419 to calculate a real classification loss 1420. The fake adversarial loss 1413, the real adversarial loss 1418, and the real classification loss 1420 are provided to the optimizer 1421 to optimize the discriminator 1402. In an embodiment, the losses 1413, 1418, and 1420 are summed up as the discriminator loss and used by the optimizer 1421 to do back-propagation and update parameters in a neural network implementing the discriminator 1402.

To train the segmentor 1403, the input source image 1415 is input to the segmentor 1403 to obtain an estimated semantic segmentation 1422. Then, this estimated segmentation 1422 is compared with a ground-truth source segmentation 1423 that is based on the input image 1415 (which may be a landmark based segmentation) to calculate a real segmentation loss 1424. The optimizer 1425 utilizes this loss 1424 to optimize the segmentor 1403. In an embodiment, the optimizer 1425 performs a back-propagation and updates parameters in a neural network implementing the segmentor 1403.

Overall Objective

According to an embodiment, the overall objective function of an implementation of the SCGAN to optimize G, D, and S is represented by:

$$\mathcal{L}_S = \mathcal{L}_{seg}^{real}, \quad (1)$$

$$\mathcal{L}_D = -\mathcal{L}_{adv} + \lambda_{cls} \mathcal{L}_{cls}^{real}, \quad (2)$$

$$\mathcal{L}_G = \mathcal{L}_{adv} + \lambda_{cls} \mathcal{L}_{cls}^{fake} + \lambda_{seg} \mathcal{L}_{seg}^{fake}, \quad (3)$$

Where $\mathcal{L}_S$, $\mathcal{L}_D$ and $\mathcal{L}_G$ are objective functions to optimize S, D, and G. $\mathcal{L}_{adv}$ is adversarial loss, $\mathcal{L}_{cls}$ is classification loss and $\mathcal{L}_{seg}$ is segmentation loss. $\lambda_{seg}$ and $\lambda_{cls}$ are hyper-parameters which control the relative importance of $\mathcal{L}_{seg}$ and $\mathcal{L}_{cls}$ compared to $\mathcal{L}_{adv}$. In the following subsections, each term in these objectives is detailed.

Adversarial Loss

In an embodiment, to generate realistic images which cannot be distinguished from original data, a conditional objective from Wasserstein GAN with gradient penalty [Gulrajani et al., "Improved training of wasserstein gans," arXiv preprint arXiv:1704.00028 (2017)] is employed which can be defined as $$\mathcal{L}_{adv} = \mathbb{E}_x[D_a(x)] + \mathbb{E}_{x,c,s}[D_a(G(z,c,s))] + \lambda_{gp} \mathbb{E}_{\hat{x}}[(\|\nabla_{\hat{x}} D_a(\hat{x})\|_2 - 1)^2], \quad (4)$$

where G(z, c, s) is the generated image conditioned on both attribute label c and segmentation s, $\lambda_{gp}$ controls the weight of a gradient penalty term, $\hat{x}$ is the uniformly interpolated samples between a real image x and its corresponding fake image G(z, c, s). During a training process, D and G act as two adversarial players where D tries to maximize this loss while G tries to minimize the loss.

Segmentation Loss

An embodiment employs a segmentation loss which acts as a spatial constraint to regulate the generator to comply with the spatial information defined by the input semantic segmentation. According to an embodiment, the proposed real segmentation loss to optimize the segmentor network S is defined as $$\mathcal{L}_{seg}^{real} = \mathbb{E}_{x,s}[A_s(s, S(x))], \quad (5)$$

where $A_s(\cdot, \cdot)$ computes cross-entropy loss pixel-wisely by $$A_s(a, b) = -\sum_{i=1}^{H}\sum_{j=1}^{W}\sum_{k=1}^{n_s} a_{i,j,k} \log b_{i,j,k}, \quad (6)$$

where a is the ground-truth segmentation and b is the estimated segmentation of a with size ($H \times W \times n_s$). Taking a real image sample x as input, estimated segmentation S(x) is compared with ground-truth segmentation s to optimize the segmentor S. When training together with the generator G, the segmentation loss term to optimize G is defined as $$\mathcal{L}_{seg}^{fake} = \mathbb{E}_{x,c,s}[A_s(s, S(G(s,c,s)))], \quad (7)$$

where the segmentor takes the fake image generated by the generator G(z, c, s) as input and outputs an estimated segmentation S(G(z, c, s)), which is compared with input segmentation s to the generator. By minimizing this loss term in the full objective $\mathcal{L}_G$, the generator is forced to generate fake images which are consistent with the input semantic segmentation s.

Classification Loss

An embodiment embeds an auxiliary multi-attribute classifier $D_c$ which shares the weights with $D_d$ in discriminator D except the output layer. $D_c$ enables an embodiment of the SCGAN to generate attribute conditioned images. The auxiliary classifier $D_c$ takes an image as input and classifies the image into independent probabilities of $n_c$ attribute labels. During training, the model $D_c$ learns to classify input images into their attribute labels by optimizing the classification loss for real samples defined as $$\mathcal{L}_{cls}^{real} = \mathbb{E}_{x,c}[A_c(c, D_c(x))], \quad (8)$$

where (x, c) are a real image with its ground-truth attribute label, $A_c(\cdot, \cdot)$ computes a multi-class binary cross-entropy loss by $$A_c(a,b) = -\Sigma_k a_k \log(b_k)$$

with a and b being two vectors of identical size ($1 \times n_c$). Accordingly, the classification loss for fake samples is given by $$\mathcal{L}_{cls}^{fake} = \mathbb{E}_{x,c,s}[A_c(c, D_c(G(z,c,s)))], \quad (9)$$

which takes the fake image G(z, c, s) as input and guides the generator G to generate attribute-specific images according to the classification information learned from real samples.

An embodiment utilizes a training procedure for training the network including the generator, discriminator, and segmentor. In one such example embodiment, let $\theta_G$, $\theta_D$, and $\theta_S$ be the parameters of the networks G, D, and S, respectively. In such an embodiment, the objective is to find a converged $\theta_G$ with minimized $\mathcal{L}_G$. According to an embodiment, when training the proposed SCGAN, a batch of latent vectors are sampled from a Gaussian distribution $\mathcal{N}(0, 1)$ (which refers to a normal distribution with mean 0 and variation 1). A batch of real images each with a ground-truth segmentation and attribute labels are randomly sampled from the joint distribution $\mathbb{P}_{data}(x, c, s)$ of a dataset. To avoid over-fitting, s may be randomly shuffled to obtain target segmentation $s_t$ to be input to $\theta_G$. According to an embodiment, first, D is trained with x and c by optimizing $\mathcal{L}_D$. Then, S is trained with x and s by optimizing the objective $\mathcal{L}_{seg}^{real}$. D and S are trained repeatedly, e.g., five times, before training G. G takes z, c, and $s_t$ as inputs and generates a fake image G(z, c, $s_t$), which is input to D and S to calculate the loss terms $\mathcal{L}_{adv}$, $\mathcal{L}_{cls}^{fake}$, and $\mathcal{L}_{seg}^{fake}$. G is optimized by minimizing the full objective $\mathcal{L}_G$. According to an embodiment, when training the generator, segmentor, and discriminator, $\lambda_{cls}=5$, $\lambda_{seg}=1$, $\lambda_{gp}=10$, $n_{repeat}=5$, and a batch size m=16 is used.

According to an embodiment, the training procedure, in which u(0,1) refers to a uniform distribution between 0 and 1, is given by:

---

Input: Initialized generator parameter $\theta_G$, discriminator parameter $\theta_D$ and segmentor parameter $\theta_S$.
1  while $\theta_G$ has not converged do
2    | for n = 1, ..., $n_{repeat}$ do
3    | | Sample a batch of latent vectors $\{z^i\}_{i=1}^m \sim \mathcal{N}(0, 1)$;
4    | | Sample a batch of real data pairs of real images, attribute labels and semantic segmentations $\{x^i, c^i, s^i\}_{i=1}^m$ from data distribution $\mathbb{P}_{data}(x, c, s)$;
5    | | Sample a batch of numbers $\{\epsilon^i\}_{i=1}^m \sim \mathcal{U}(0, 1)$;
6    | | $\{s_t^i\}_{i=1}^m \leftarrow$ shuffle($\{s^i\}_{i=1}^m$);
7    | | for i = 1, ..., m do
8    | | | $\tilde{x}^i \leftarrow G(z^i, c^i, s_t^i)$;
9    | | | $\hat{x}^i \leftarrow \epsilon^i x^i + (1 - \epsilon^i)\tilde{x}^i$;
10   | | | $\mathcal{L}_{adv}^i \leftarrow D_d(\tilde{x}^i) - D_d(x^i) + \lambda_{gp}(\|\nabla D_d(\hat{x}^i)\|_2 - 1)^2$;
11   | | | $\mathcal{L}_{cls}^{real,i} \leftarrow A_c(c^i, D_c(x^i))$;
12   | | | $\mathcal{L}_{seg}^{real,i} \leftarrow A_s(s^i, S(x^i))$;
13   | | end
14   | Update $\mathcal{D}$ by descending its gradient:
15   |    $\nabla_{\theta_D} \frac{1}{m}\sum_i^m \mathcal{L}_{adv}^i + \lambda_{cls}\mathcal{L}_{cls}^{real,i}$;
16   | Update $\mathcal{S}$ by descending its gradient:
17   |    $\nabla_{\theta_S} \frac{1}{m}\sum_i^m \mathcal{L}_{seg}^{real,i}$;
18   | end
19   | Sample a batch of latent vectors $\{z^i\}_{i=1}^m \sim \mathcal{N}(0,1)$;
20   | for i = 1, ..., m do
21   | | $\tilde{x}^i \leftarrow G(z^i, c^i, s_t^i)$;
22   | | $\mathcal{L}_{adv}^i \leftarrow D_d(\tilde{x}^i)$;
23   | | $\mathcal{L}_{cls}^{fake,i} \leftarrow A_c(c^i, D_c(\hat{x}^i))$;
24   | | $\mathcal{L}_{seg}^{fake,i} \leftarrow A_s(s_t^i, S(\hat{x}^i))$;
25   | end
26   | Update $\mathcal{G}$ by descending its gradient:
27   |    $\nabla_{\theta_G} \frac{1}{m}\sum_i^m -\mathcal{L}_{adv}^i + \lambda_{cls}\mathcal{L}_{cls}^{fake,i} + \lambda_{seg}\mathcal{L}_{seg}^{fake,i}$;
28 end
Output: Converged generator parameter $\theta_G$.

---

Hereinbelow, in relation to FIGS. 15-20, experimental results of embodiments are discussed. For the results, the effectiveness of embodiments of the SCGAN was verified on two datasets with both semantic segmentation and attribute labels. The results show both visual and quantitative results compared with representative methods, present the spatial interpolation ability of embodiments in terms of face synthesis, explore configurations of the generator network to solve a foreground-background mismatch problem, and showcase the model stability and convergence via an ablation study.

Two datasets with semantic segmentation and attribute-level labels, CelebA [Liu et al., "Deep Learning Face Attributes in the Wild," In ICCV (2015)] and DeepFashion [Liu et al., "DeepFashion: Powering Robust Clothes Recognition and Retrieval with Rich Annotations," In CVPR (2016); Zhu et al., "Be Your Own Prada: Fashion Synthesis with Structural Coherence," In ICCV (2017)] were employed to evaluate the performance of embodiments.

The CelebA dataset contains 202,599 face images of celebrities with 40 binary attribute labels and 5-point facial landmarks. To obtain the results, the aligned version of CelebA was used and five attributes including black hair, blond hair, brown hair, gender and age were selected. To obtain a semantic segmentation, the Dlib [King, "Dlib-ml: A Machine Learning Toolkit," Journal of Machine Learning Research (2009)] landmark detector was applied to extract 68-point facial landmarks from real images. Facial landmarks separate facial attributes into different regions. By filling those regions with a semantic index, pixel-wisely, semantic segmentations are created. To provide a reliable segmentation, the failure cases were removed by comparing the extracted 68-point landmarks with the ground-truth 5-point landmarks.

The DeepFashion dataset for fashion synthesis provides 78,979 clothing images associated with attribute labels, caption, and semantic segmentation. The provide the results, the color labels, such as red, blue, white, and pink, were selected, which are independent of spatial information, and the provided semantic segmentations were used.

To implement embodiments used the obtain the results, residual up-sampling blocks were leveraged instead of transposed convolution layers for up-sampling operation. An encoder-decoder structure with several residual blocks [He et al., "Deep residual learning for image recognition" In CVPR (2016)] as a bottleneck was used in the segmentor network. Batch normalization [Ioffe et al., "Batch Normalization: Accelerating Deep Network Training by Reducing Internal Covariate Shift," In International Conference on Machine Learning, 448-456 (2015)] in both the generator and the segmentor was replaced with instance normalization [Ulyanov et al., "Instance Normalization: The Missing Ingredient for Fast Stylization," arXiv preprint arXiv:1607.08022 (2016)]. The PatchGAN structure [Isola et al., "Image-to-image translation with conditional adversarial networks," arXiv preprint arXiv:1611.07004 (2016)] was followed with a no normalization method in constructing the discriminator network. Three Adam optimizers [Kingma et al., "Adam: A method for stochastic optimization," arXiv preprint arXiv:1412.6980 (2014)] with $\beta 1$ of 0.5 and $\beta 2$ of 0.999 were used to optimize the networks. The learning rates were set to be 0.0001. The proposed SCGAN was implemented in Pytorch [Paszke et al., "Automatic differentiation in PyTorch," (2017)].

Because embodiments of the proposed SCGAN take both conditional labels and semantic segmentation as inputs, embodiments are compared with existing methods (generative models and image-to-image translation methods) that consider both inputs. Generative models include WGAN [Gulrajani et al., "Improved training of wasserstein gans," arXiv preprint arXiv:1704.00028 (2017)] and ACGAN [Odena et al., "Conditional image synthesis with auxiliary classifier gans," arXiv preprint arXiv:1610.09585 (2016)] which are representative of an unconditional and a conditional GAN model, respectively. ACGAN, however, is old-fashion and generates low-quality images. To obtain results, the training algorithm and architecture of WGAN was adopted into ACGAN to improve the visual quality and stabilize the training process, which is referred to as ACWGAN herein.

Pix2Pix [Isola et al., "Image-to-image translation with conditional adversarial networks," arXiv preprint arXiv:1611.07004 (2016)] and Cycle-GAN [Zhu et al., "Unpaired image-to-image translation using cycle-consistent adversarial networks," arXiv preprint arXiv:1703.10593 (2017)] are two popular image-to-image translation methods, which take semantic segmentation as input and synthesize realistic images. Pix2Pix requires being trained using paired images while CycleGAN is trained in an unpaired way. To obtain the results described below, official implementations released by the authors of Pix2Pix and CycleGan were used and the implementation parameters were tuned to deliver good results.

Figure 15:
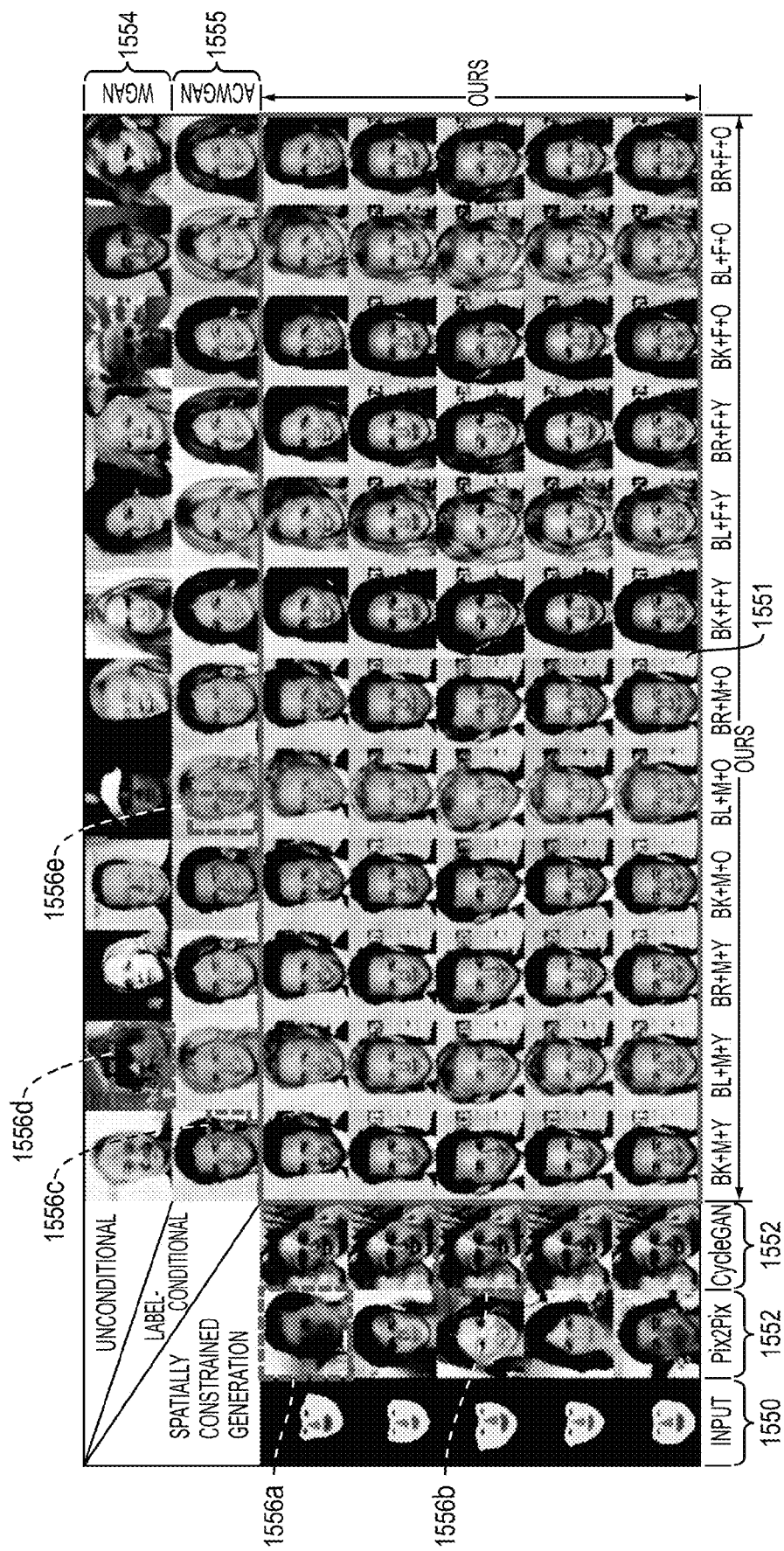
FIG. 15 compares images generated according to embodiments and existing image generation techniques.

FIG. 15 shows results comparing images generated using embodiments of the SCGAN with existing generative models (WGAN and ACWGAN) and image-to-image translation models (Pix2Pix and CycleGAN) on the CelebA dataset. The results in FIG. 15 were obtained using the segmentations in the column 1550. Image synthesis results from embodiments of the present invention are in the rectangle 1551. Image generation results from the spatially constrained methods Pix2Pix and CycleGAN are shown in the columns 1552 and 1553, respectively. Results from the unconditional method WGAN are shown in the row 1554 and results from the label-conditional method ACWGAN are in row 1555. Failure cases are shown in the boxes 1556a-e. In FIG. 15 BK refers to black hair, BL refers to blonde hair, BR refers to brown hair, M refers to male, F refers to female, Y refers to young, and O refers to old.

The methods used to generate the results in FIG. 15 can be divided into three categories, unconditional, label-conditional, and spatially constrained generation. The row 1554 shows the unconditional random images generated by WGAN without any controllability on the generating results. The visual quality of the WGAN results in row 1554 is good in most cases. Unfortunately, "ghost faces" still occur, as shown in the rectangle 1556d. Those "ghost faces" have uncontrolled boundaries of facial attributes. With semantic segmentation as a spatial constraint to guide the image generation process, the results of embodiments of the present invention (in the rectangle 1551) do not include "ghost faces" and are reliable and high-quality results.

The row 1555 shows the attribute-conditional results generated by ACWGAN with a fixed latent vector z. Compared to the results 1555, embodiments of the present invention produce much higher visual quality images. For the ACWGAN results 1555, attribute labels also affect the background color and, as a result, female images look much warmer than male images. In the results 1551 from embodiments of the present invention, spatial and attribute information is decoupled well from the other unregulated contents determined by the input latent vector. With a fixed latent vector, embodiments produce consistent images with fixed backgrounds. In embodiments, facial attributes can be regulated by input label without causing unrelated contents to be changed. Due to the high frequency signal from boundaries of attributes in semantic segmentation, embodiments of the SCGAN described herein produce a large amount of sharp details which make the results more realistic compared to other methods.

Compared with the image-to-image translation method results 1552 and 1553 (Pix2Pix and CycleGan), embodiments of the present invention generate images with variations on facial attributes. It is worthy to note that embodiments may do one-to-many generations directed by the input latent vector and attribute label, while image-to-image translation methods, such as Pix2Pix and CycleGan only provide one-to-one generation.

In the spatially constrained generation, the input segmentations are shown in the column 1550, and the results of Pix2Pix and CycleGAN are shown in the columns 1552 and 1553, respectively. The faces generated by Pix2Pix (shown in column 1552) are of low quality. The faces generated by CycleGAN (shown in the column 1554) suffer from a mode collapse issue because the CycleGAN model only gives a single output no matter the input segmentation. One possible reason for the low quality results 1552 and 1553 is because translating facial segmentation to realistic faces is essentially a one-to-many translation. However, the image-to-image translation methods Pix2Pix and CycleGAN both assume a one-to-one mapping between input and target domains. Especially for CycleGAN, the cycle-consistency loss employed in CycleGAN tends to enforce a one-to-one mapping by trying to maintain the contents during a cycle translating forward and backward. However, in this application, when a face image is translated into its semantic segmentation, it is barely possible to translate it back to the original face due to the information lost in the many-to-one translation. The Pix2Pix and CycleGAN methods struggle to look for a one-to-one mapping from the one-to-many mapping and eventually fail to achieve it.

Compared to generative models, embodiments have additional controllability on spatial domain regulation by employing an input semantic segmentation. When compared to image-to-image translation methods, embodiments are capable of performing a one-to-many mapping, which generates diversified images with variation in the facial attributes due to the latent vector and attribute label inputs. Embodiments of the present invention are also superior in general image quality, particular at boundaries. Embodiments of the SCGAN described herein, are superior in terms of diverse variations, controllability, and realistic high-quality results compared to state-of-the-art image-to-image translation methods.

In addition to face synthesis, embodiments of the SCGAN are able to control the orientation and facial expressions of the synthesized faces by feeding corresponding semantic segmentations as guidance. In order to synthesize faces of every intermediate state between two facial orientations and expressions, in embodiments, semantic segmentations of those intermediate states are used as inputs. However, it is challenging to obtain such spatially intermediate semantic segmentations. Since semantic segmentations are represented as a pixel-wise k-channel image, numeric interpolations between two segmentations results in a fade-in and fade-out effect, which is not a spatial interpolation between two states.

Embodiments solve this challenge by interpolating in a facial landmarks domain instead of a segmentation domain. As x-y coordinates, values of facial landmarks represent their physical locations. Therefore, numeric interpolation between two facial landmarks creates every intermediate state of facial landmarks in a spatial domain. In an embodiment, semantic segmentations are constructed from those landmarks to obtain spatial-varying semantic segmentations. By feeding those segmentations with the other inputs, a latent vector and a fixed attribute label, embodiments can generate every intermediate image between face orientations and expressions.

Figure 16:
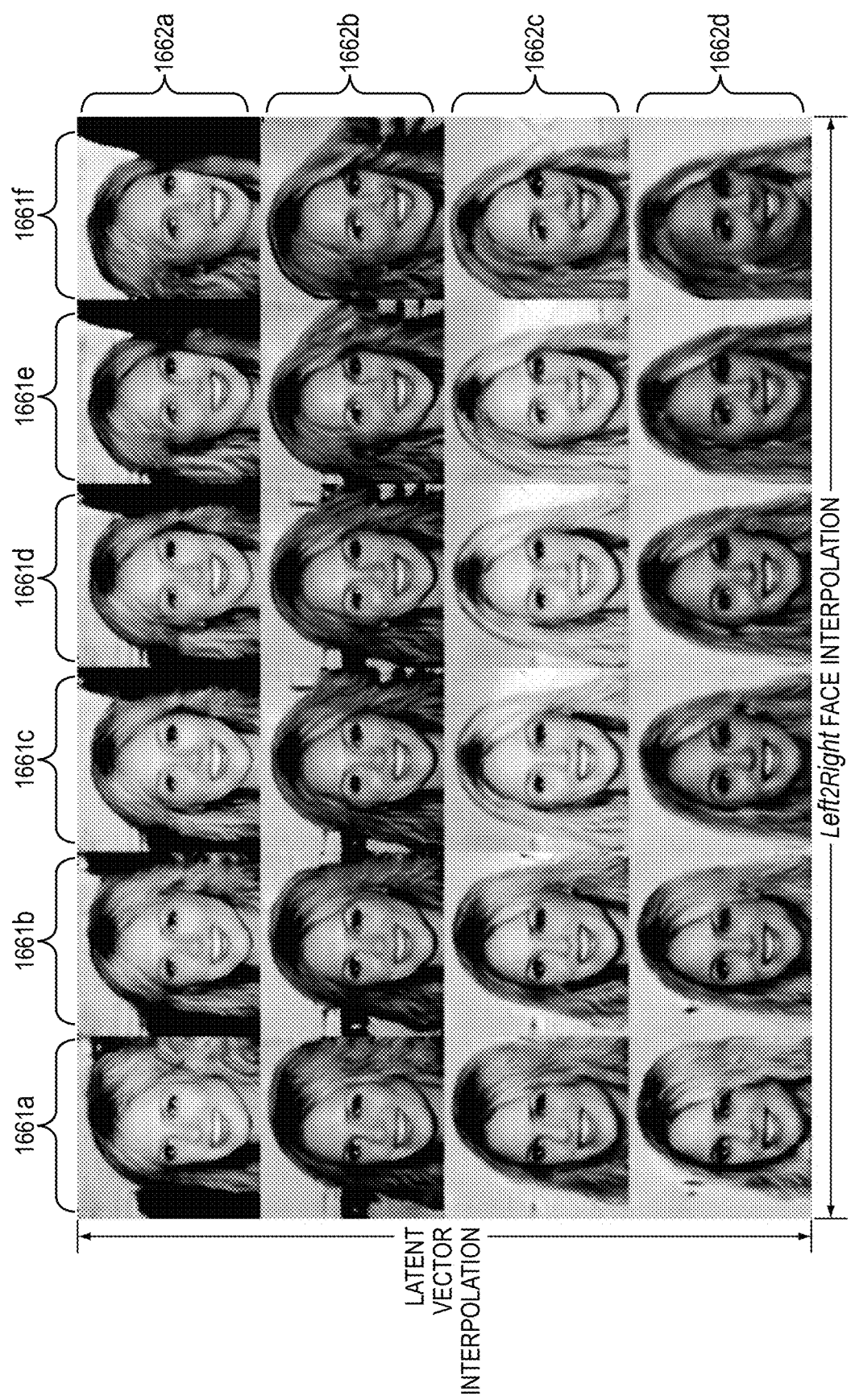
FIG. 16 portrays images generated according to principles of an embodiment.
Figure 17:
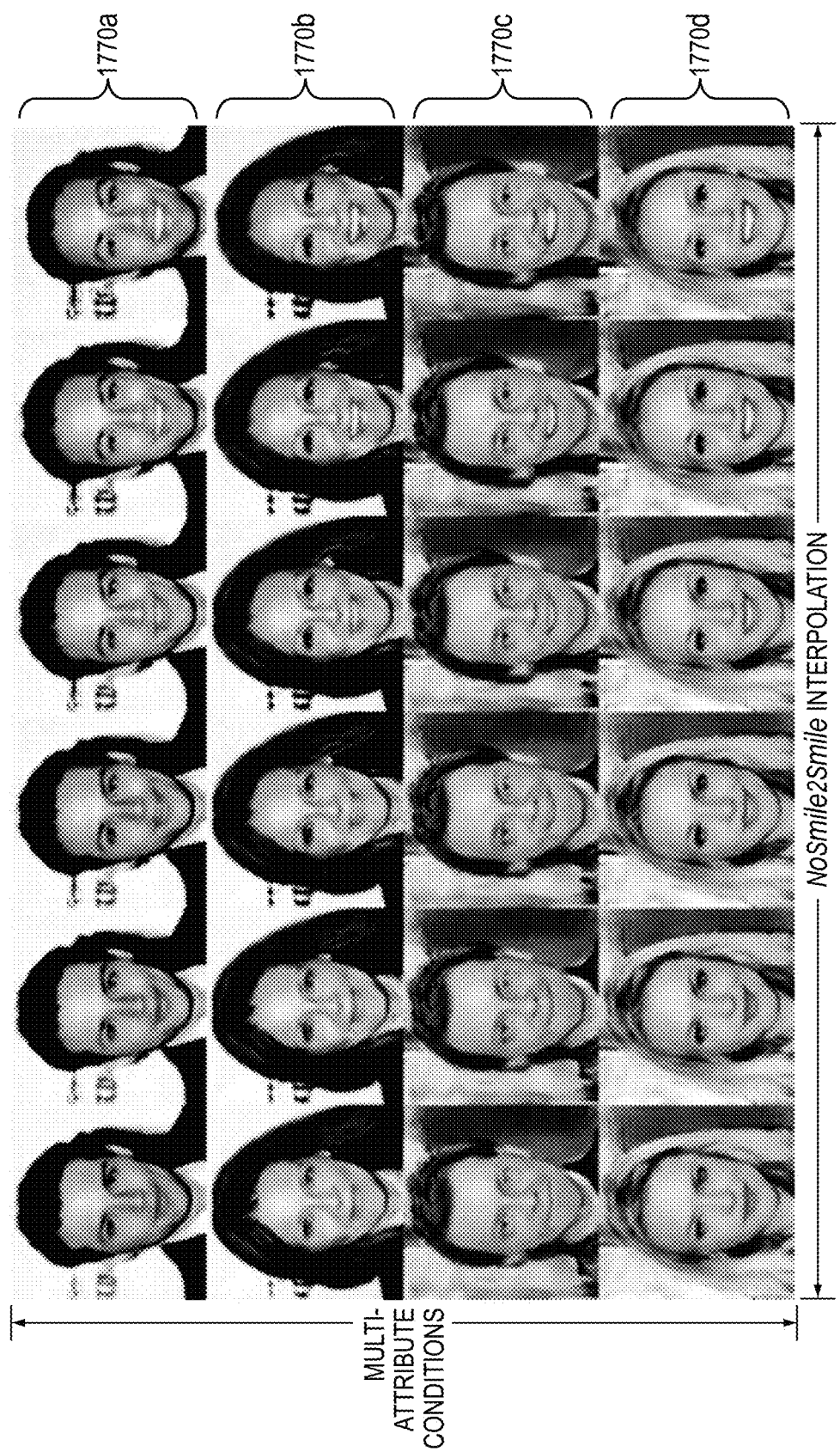
FIG. 17 depicts faces generated using an embodiment of the invention.

Results of interpolation functionality of embodiments is shown in FIGS. 16 and 17. FIG. 17 shows two-dimension interpolation results on latent space between Left2Right faces of SCGAN. In FIG. 16, each column 1661a-f shows the image generation results on interpolated latent vectors and each row 1662a-d shows the interpolation results on facial orientations from left-side face to right-side face. FIG. 17 shows the NoSmile2Smile facial expression interpolations generated by an embodiment of the SCGAN. Each row 1770a-d shows a group of interpolated results between not-smiling face and smiling face with a fixed specific attribute label and latent vector.

As shown in FIGS. 16 and 17, embodiments of the invention can generate spatially interpolated faces from left-side face to right-side face (Left2Right), shown in FIG. 16, and not smiling face to smiling face (NoSmile2Smile), shown in FIG. 17. It is noted that Left2Right interpolation, as shown in FIG. 16, is not merely creating mirrored faces and, instead, the components including the asymmetric hair style "rotate" with the orientation of the head. The Left2Right and NoSmile2Smile interpolation provides very natural, consistent, and realistic results, which can be employed in numerous applications, such as, synthesizing face videos with liveness. Existing generative methods cannot achieve such controllability or deliver similar spatially interpolated results.

Figure 18:
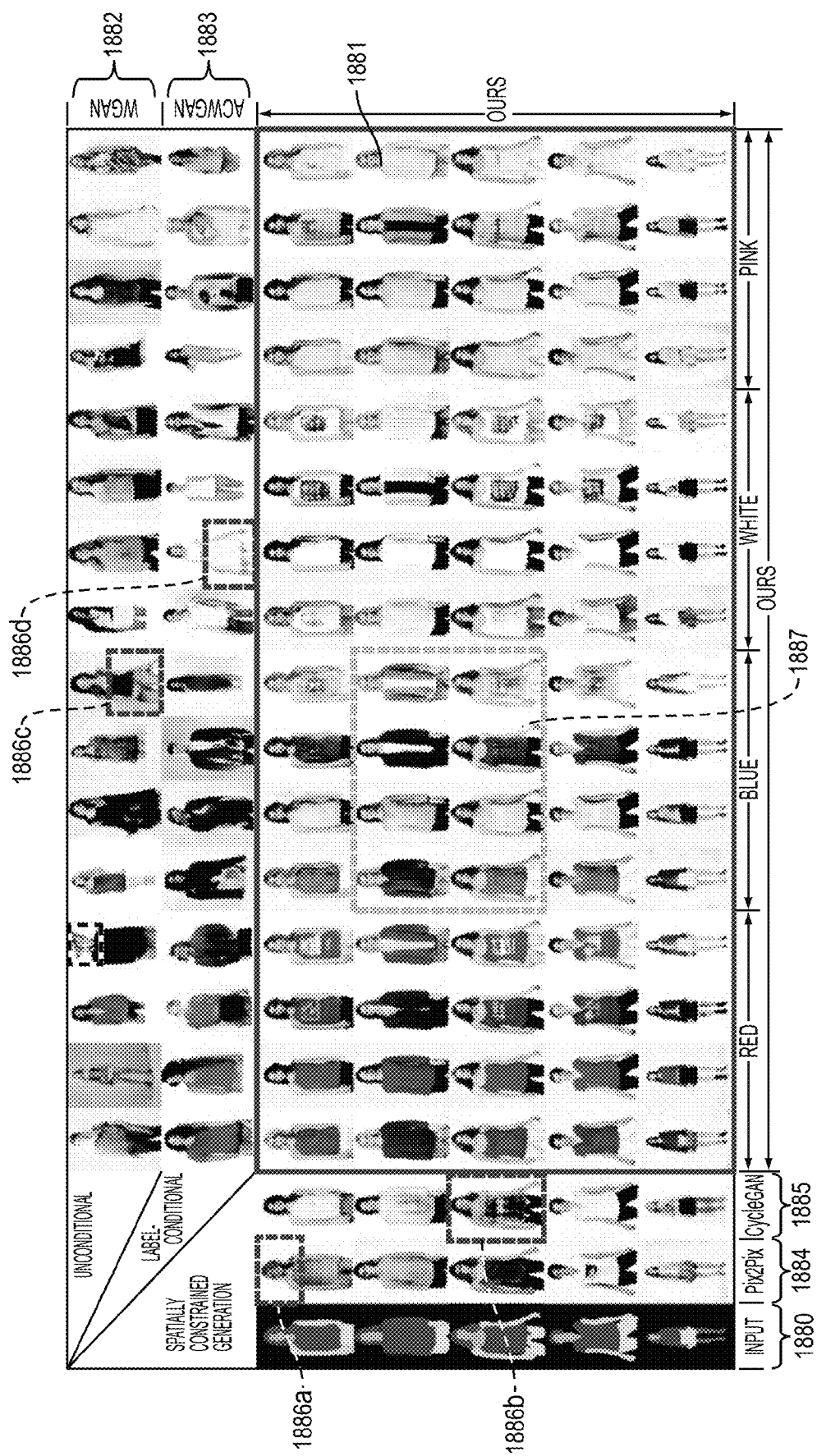
FIG. 18 compares images generated according to an embodiment and existing image generation techniques.

FIG. 18 compares spatially constrained fashion synthesis results generated using embodiments of the present invention and the generative models (WGAN and ACWGAN) and image-to-image translation models (Pix2Pix and CycleGAN) on the DeepFashion dataset. The input segmentations used to generate the results are in the column 1880. Results generated using embodiments of the invention are in the rectangle 1881. Results from the generative methods WGAN and ACWGAN are shown in the rows 1882 and 1883, respectively. Results from the image-to-image methods Pix2Pix and CycleGAN are shown in the columns 1884 and 1885, respectively. Failure cases are shown in the rectangles 1886a-d while representative results in the rectangle 1887 demonstrate the generated diversity of embodiments.

Comparison results on the DeepFashion dataset presented in FIG. 18 demonstrate advantages of embodiments of the SCGAN over existing methods. In FIG. 18, the input segmentation, results of Pix2Pix, and results of CycleGAN are shown in the columns 1880, 1884, and 1885, respectively. Generated fashion images by WGAN and ACWGAN are shown in the rows 1882 and 1883, respectively. The images in the large rectangle 1881 are results generated from embodiments of the SCGAN with semantic segmentation, attribute labels, and latent vectors as inputs. In contrast to the results on the CelebA dataset (discussed hereinabove in relation to FIG. 15), image-to-image translation methods, Pix2Pix and CycleGAN produce acceptable results (shown in columns 1884 and 1885) on the DeepFashion dataset. This is because the intrinsic one-to-many property in the DeepFashion dataset is not as strong as in the CelebA dataset. The functionality of shape preservation becomes more important than general visual discrimination. However, the results (1884 and 1885) from Pix2Pix and CycleGAN lack controllability and variability compared to the results from embodiments of the present invention shown in the rectangle 1887.

Although WGAN can generally produce acceptable results with large variation and ACWGAN can produce diversified images based on an input color label (red, blue, white, and pink), "ghost images" shown by the rectangles 1886c-d occur. Lacking spatial regulation, WGAN and ACWAN both produce images with unexpected boundaries which make the generated results unrealistic. Embodiments produce sharper and more realistic fashion style images with both spatial controllability and attribute-level controllability because of the introduction of a semantic segmentation as a spatial constraint. The components in the DeepFashion datasets are decoupled into three categories such that spatial fashion style is controllable by input semantic segmentation, color is controlled by attribute label, and the other finer details of fashion design, including color shade, skin color, and hair color are determined by the input latent vector.

The effectiveness of embodiments can also be shown by a quantitative evaluation. To quantitatively evaluate the effectiveness of spatially constrained image generation of SCGAN embodiments, an experiment to examine the spatial consistency with input semantic segmentation can be performed. To perform such a determination, a pretrained segmentor may be used to estimate the segmentations of generated images. The estimated segmentations can then be compared with the original input segmentations to calculate the average accuracy of the segmentations. The ceiling of this accuracy is calculated by taking images from an original dataset as input and comparing segmentations generated by the segmentor (implemented in an embodiment) with ground-truth segmentations of the images. The floor of this accuracy is calculated by using shuffled unpaired images and segmentation. Because existing GAN based methods cannot achieve spatially constrained generation, results of embodiments can be compared with the image-to-image translation methods of CycleGAN and Pix2Pix. Results of the quantitative evaluation are shown in the table below:

| Datasets | CelebA | DeepFashion |
| --- | --- | --- |
| Shuffled (floor) | 0.9204 | 0.8027 |
| CycleGAN [45] | 0.9292 | 0.8221 |
| Pix2Pix [12] | 0.9805 | 0.8291 |
| SCGAN (ours) | 0.9895 | 0.8323 |
| Original (ceiling) | 0.9928 | 0.8341 |

As shown in the table above, the SCGAN embodiment achieves the best accuracies with both datasets, CelebA and DeepFashion. The performance of embodiments is close to the accuracy ceilings of the original datasets, which validates that embodiments can generate spatially accurate images that comply with input semantic segmentations.

The generator of an embodiment of the SCGAN takes three inputs, semantic segmentation, latent vector, and attribute label. A critical issue is that the contents in the synthesized image should be decoupled well to be controlled by those inputs (semantic segmentation, latent vector, and attribute label). If the contents in the synthesized image are not decoupled well, the inputs to the generator may conflict with each other. To demonstrate that feature, well decoupled contents of the synthesized image, in an embodiment, the input orders are reversed and a generator is implemented which first, takes the latent vector as input for transposed convolution, and second, inputs the semantic segmentation and attribute label. Herein, this variation of the generator is referred to as reversed-order G.

Figure 19:
FIG. 19 shows results of image generation by an embodiment verifying functionality of embodiments.

FIG. 19 compares results of a generator of an embodiment of the SCGAN and the results of a reversed-order G generator. The row 1990 shows the input segmentation. The rows 1991a-b are results generated by SCGAN with a reversed-order G generator. The rows 1992a-b are results of an embodiment of the generator in SCGAN as described herein.

As shown in FIG. 19, severe foreground-background mismatches occur in the results of reversed-order G (rows 1991a-b) such that the facial components regulated by the input segmentation cannot be merged correctly with the skin color and hair style determined by the latent vector. To tackle this challenge, embodiments may employ a generator that functions in a step-by-step way to first, extract spatial information from semantic segmentation to construct the basic spatial structure of the synthesized image. Second, such an embodiment of the generator, takes the latent vector to add variations to the other unregulated components, and, in turn, uses the attribute label to render attribute-specific contents. As a result, embodiments of the generator can successfully decouple the contents of synthesized images into controllable inputs. This approach solves the foreground-background merging problem and generates spatially controllable and attribute-specific images with variations on other unregulated contents.

Figure 20:
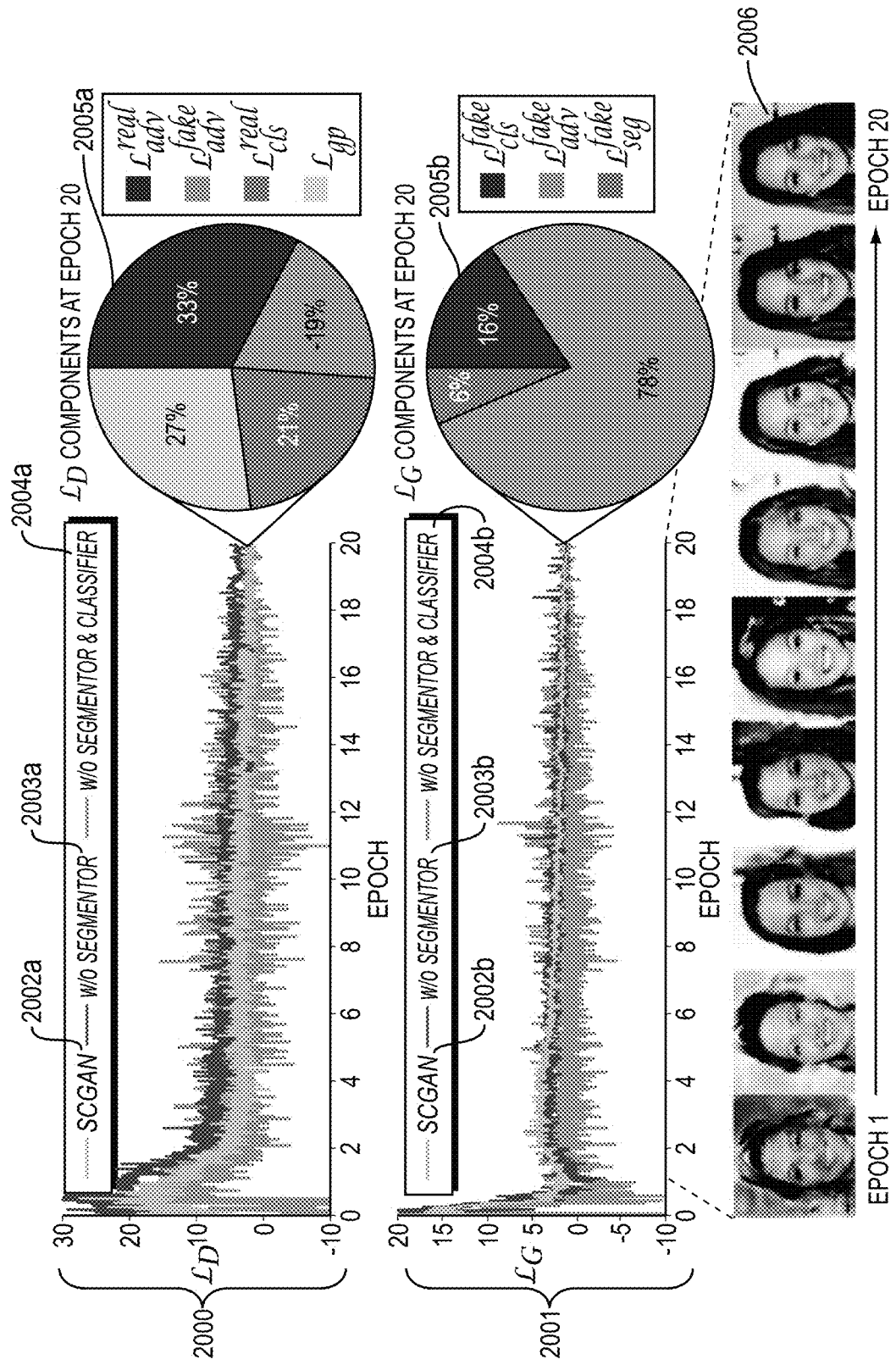
FIG. 20 are plots showing the loss results of a discriminator and generator during training.

Embodiments of the SCGAN converge fast and stably due to the introduction of the segmentor and the auxiliary classifier. In order to verify this point, an ablation study on model convergence can be implemented by removing the segmentor and auxiliary classifier step by step. FIG. 20 shows the losses of a generator and a discriminator, implemented in such an ablation study during the training process on the CelebA dataset. The plot 2000 shows discriminator loss versus epoch, i.e., shows discriminator loss as training proceeds. The plot 2001 shows generator loss versus epoch, i.e., shows generator loss as training proceeds. In embodiments, the neural networks may be trained iteratively. Accordingly, an epoch is a measure of the number of times the training vectors are used to update the weights of the neural network. Completely feeding the available data and updating the weights of networks is considered the end of one epoch, after which, training will continue by feeding the data again in the next epoch. In the plots 2000 and 2001, the lines 2002a-b are losses of SCGAN and the lines 2003a-b are the losses after removing the segmentor. The lines 2004a-b show the losses after removing both the segmentor and the auxiliary classifier, while the other elements, such as model architecture and hyper-parameters are kept unchanged.

The training process of SCGAN is stable with less vibration on losses. In the plot of discriminator losses 2000, the convergence of SCGAN happens faster and the final loss is smaller than the other two ablation experiments. In the plot of generator losses 2001, even though SCGAN introduces an additional segmentation loss, the final loss reaches the same level of an embodiment of the invention without the segmentor. The pie charts 2005a and 2005b show the percentage of each loss component after convergence at epoch 20. The pie charts 2005a and 2005b demonstrate that the segmentation loss and classification loss both play roles and cannot be neglected. FIG. 20 also shows the SCGAN generated samples 2006 during the training process. As can been in FIG. 20, the visual quality of the generated samples 2006 improves gradually as the model converges.

Embodiments of the SCGAN introduce spatial constraints in the conditional image generation task. Embodiments, obtain promising visual and quantitative results compared with other popular generative models and image-to-image translation methods on the CelebA and DeepFashion datasets. The results demonstrate that embodiments of the SCGAN can control spatial contents, specify attributes, and improve generated image visual quality. Embodiments also solve the foreground-background mismatch problem as demonstrated by comparing the different configurations of the generator. As shown by the ablation study discussed in relation to FIG. 20, embodiments are easy and fast to train as the introduced segmentor network accelerates and stabilizes the model convergence during the training process. Furthermore, embodiments provide an effective way to obtain accurate and reliable semantic segmentations of all intermediate states for the CelebA dataset using facial landmarks, which enables interesting applications such as the Left2Right and NoSmile2Smile interpolation.

An example embodiment of the invention is directed to a conditional and target-oriented image generation task using a novel deep learning based adversarial network. In particular, one such example embodiment increases the controllability of image generation by using semantic segmentation as spatial constraints and attribute labels as conditional guidance. Embodiments can control the spatial contents as well as attribute-specific contents and generate diversified images with sharper and more realistic details.

An embodiment can generate face images with respective target face shapes and facial attribute location, as well as control a facial attribute, such as gender, hair color, and age of the generated face images. Embodiments can control orientation of generated face images and generate intermediate states between left face and right faces. Embodiment can also generate fashion design images with specified fashion style and color. Further, embodiments can be generalized to other target-oriented image generation applications, such as bedroom photo generation and building design generation. Moreover, embodiments can be trained with any appropriate dataset for the desired image generation task.

Embodiments generate more realistic results with better image quality (sharper and clearer details). Embodiments add spatial controllability to existing image generation methods, which enables embodiments to generate target-oriented images rather than generating random images. Embodiments decouple the spatial constraints from the latent vector and make the spatial constraints available as additional control signals. Embodiments may include a generator that is specially designed for target-oriented conditional image synthesis that avoids conflicts between input signals.

An embodiment may be applied in generating criminals' faces according to descriptions from victims (which are provided as inputs via the target segmentation and/or target attributes). Another embodiment may be utilized in computer-aided design, such as fashion design, with given specified fashion style and color and bedroom design with bedroom layout. Yet another embodiment may be applied in applications (apps) for entertainment that people can let a computer generate a target face image based on specific and user-defined requirements.

An example embodiment is directed to target-oriented image generation with spatial constraints. An embodiment employs a novel, Spatially Constrained, Generative Adversarial Network (SCGAN) that decouples the spatial constraints from a latent vector and makes them available as additional control signal inputs. A SCGAN embodiment includes a generator network, a discriminator network with an auxiliary classifier, and a segmentor network, which are trained together adversarially. In an embodiment, the generator is specially designed to take a semantic segmentation, a latent vector, and an attribute label as inputs step by step to synthesize a fake image. The discriminator network tries to distinguish between real images and generated images as well as classify the images into attributes. The discrimination and classification results guide the generator to synthesize realistic images with correct target attributes. The segmentor network attempts to conduct semantic segmentations on both real images and fake images to deliver estimated segmentations to guide the generator in synthesizing spatially constrained images. With those networks, example embodiments have increased controllability of an image synthesis task. Embodiment generate target-oriented realistic images guided by semantic segmentations and attribute labels.

Figure 21:
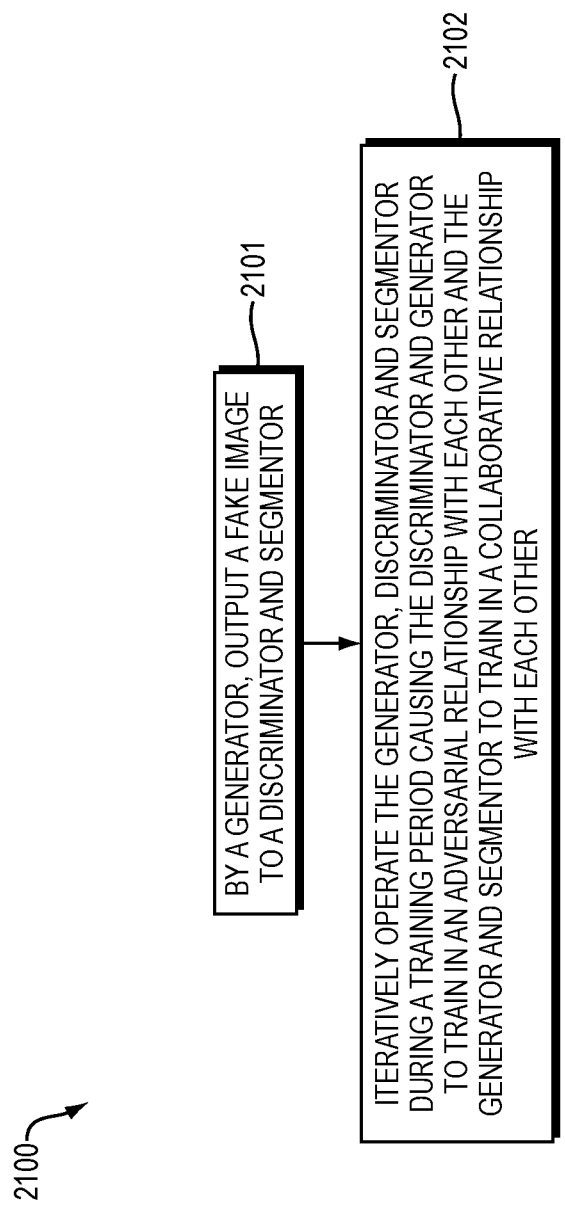
FIG. 21 is a flow diagram of a method for generating an image according to an embodiment.

FIG. 21 is a flow chart of a method 2100 for training an image generator. The method 2100: (i) trains a generator, implemented with a first neural network, to generate a fake image based on a target segmentation, (ii) trains a discriminator, implemented with a second neural network, to distinguish a real image from a fake image and output a discrimination result as a function thereof, and (iii) trains a segmentor, implemented with a third neural network, to generate a segmentation from the fake image. In the method 2100, the generator outputs 2101 a fake image to the discriminator and the segmentor. In turn, the training method 2100 iteratively operates 2102 the generator, discriminator, and segmentor during a training period. The iterative operation 2102 causes the discriminator and generator to train in an adversarial relationship with each other and the generator and segmentor to train in a collaborative relationship with each other. At the end of the training period, the generator's first neural network is trained to generate the fake image based on the target segmentation with more accuracy than at the start of the training period.

In an embodiment of the method 2100, causing the discriminator and generator to train in an adversarial relationship with each other includes the discriminator outputting the discrimination result to an optimizer and the optimizer: (i) adjusting weights of the first neural network based on the discrimination result to improve generation of the fake image by the generator and (ii) adjusting weights of the second neural network based on the discrimination result to improve distinguishing a real image from a fake image by the discriminator. In this way, the optimizer adjusts the generator to get better at creating fake images that are indistinguishable from real images and the optimizer adjusts the discriminator to get better at distinguishing real and fake images. As such, the training of the optimizer and discriminator is adversarial.

According to an embodiment of the method 2100, the segmentor is adjusted based upon differences, e.g., loses, between a segmentation determined by the segmentor from the generated fake image and the target segmentation that was used by the generator to create the fake image. In this way, the segmentor is adjusted to generate segmentations that are closer to the target segmentation. In such an embodiment, the generator, is likewise adjusted based upon the segmentation loss to generate images that are closer to the target segmentation. In this way, the segmentor and generator are trained collaboratively.

An embodiment of the method 2100 further comprises training the generator to generate the fake image based on the target segmentation and target attributes. Another embodiment of the method 2100 includes training the generator to generate the fake image based on the target segmentation, the target attributes, and a real image. In such a method embodiment of the method 2100, a given fake image is a translated version of the real image. Yet another embodiment of the method 2100 includes training the generator to generate the fake image based on the target segmentation, the target attributes, and a latent vector. According to an embodiment, the latent vector is a random vector sampled from a normal distribution.

In an embodiment of the method 2100, the generator, implemented with the first neural network, is trained to generate the fake image by: at a down-sampling convolutional block, extracting features of the target segmentation; at a first concatenation block, concatenating the extracted features with a latent vector; at an up-sampling block, constructing a layout of the fake image using the concatenated extracted features and latent vector; at a second concatenation block, concatenating the layout with an attribute label to generate a multidimensional matrix representing features of the fake image; and at an up-sampling convolutional block, generating the fake image using the multidimensional matrix.

Figure 22:
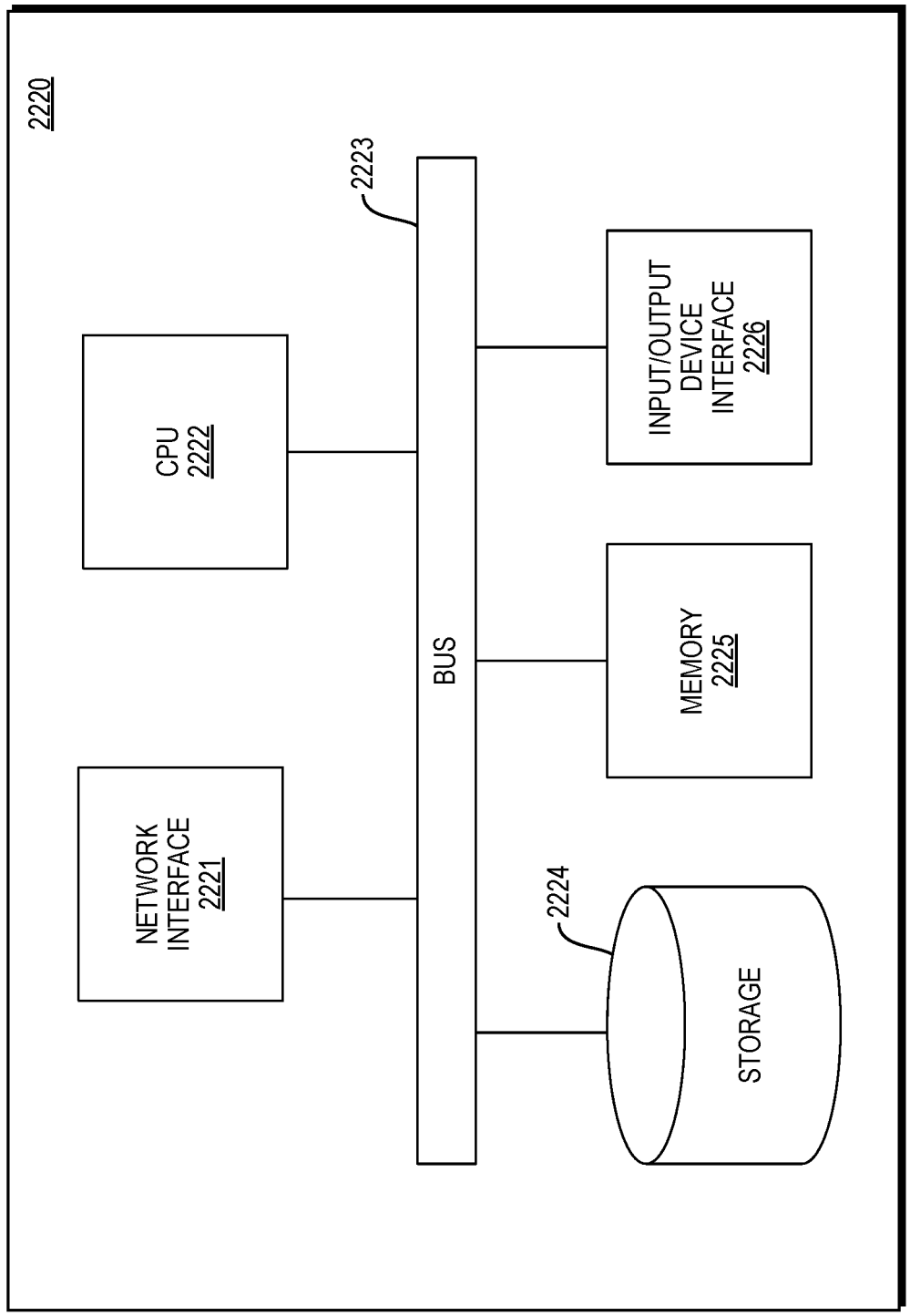
FIG. 22 is a simplified block diagram of a computer system for generating images according to embodiment.

FIG. 22 is a simplified block diagram of a computer-based system 2220 that may be used to implement any variety of the embodiments of the present invention described herein. The system 2220 comprises a bus 2223. The bus 2223 serves as an interconnect between the various components of the system 2220. Connected to the bus 2223 is an input/output device interface 2226 for connecting various input and output devices such as a keyboard, mouse, display, speakers, etc. to the system 2220. A central processing unit (CPU) 2222 is connected to the bus 2223 and provides for the execution of computer instructions implementing embodiments. Memory 2225 provides volatile storage for data used for carrying out computer instructions implementing embodiments described herein, such as those embodiments previously described hereinabove. Storage 2224 provides non-volatile storage for software instructions, such as an operating system (not shown) and embodiment configurations, etc. The system 2220 also comprises a network interface 2221 for connecting to any variety of networks known in the art, including wide area networks (WANs) and local area networks (LANs).

It should be understood that the example embodiments described herein may be implemented in many different ways. In some instances, the various methods and systems described herein may each be implemented by a physical, virtual, or hybrid general purpose computer, such as the computer system 2220, or a computer network environment such as the computer environment 2330, described herein below in relation to FIG. 23. The computer system 2220 may be transformed into the systems that execute the methods described herein, for example, by loading software instructions into either memory 2225 or non-volatile storage 2224 for execution by the CPU 2222. One of ordinary skill in the art should further understand that the system 2220 and its various components may be configured to carry out any embodiments or combination of embodiments of the present invention described herein. Further, the system 2220 may implement the various embodiments described herein utilizing any combination of hardware, software, and firmware modules operatively coupled, internally, or externally, to the system 2220.

FIG. 23 illustrates a computer network environment 2330 in which an embodiment of the present invention may be implemented. In the computer network environment 2330, the server 2331 is linked through the communications network 2332 to the clients 2333a-n. The environment 2330 may be used to allow the clients 2333a-n, alone or in combination with the server 2331, to execute any of the embodiments described herein. For non-limiting example, computer network environment 2330 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A system for training an image generator, the system comprising a processor and a memory with computer code instructions stored thereon, the processor and the memory, with the computer code instructions, being configured to cause the system to provide:
   a generator implemented with a first neural network configured to generate a fake image based on a target segmentation;
   a discriminator implemented with a second neural network configured to distinguish a real image from a fake image and output a discrimination result as a function thereof; and
   a segmentor implemented with a third neural network configured to generate a segmentation from the fake image;
   wherein the generator outputs the fake image to the discriminator and the segmentor; and
   wherein iterative operation of the generator, discriminator, and segmentor during a training period causes the discriminator and generator to train in an adversarial relationship with each other and the generator and segmentor to train in a collaborative relationship with each other, the generator at the end of the training period having its first neural network trained to generate the fake image based on the target segmentation with more accuracy than at the start of the training period.

2. The system of claim 1 wherein the generator is further configured to generate the fake image based on the target segmentation and target attributes.

3. The system of claim 2 wherein the generator is further configured to generate the fake image based on the target segmentation, the target attributes, and a real image.

4. The system of claim 3 wherein a given fake image is a translated version of the real image.

5. The system of claim 2 wherein the generator is further configured to generate the fake image based on the target segmentation, the target attributes, and a latent vector.

6. The system of claim 5 wherein the latent vector is a random vector sampled from a normal distribution.

7. The system of claim 1 wherein, to implement the discriminator and generator to train in an adversarial relationship with each other:
the discriminator is configured to output the discrimination result to an optimizer; and
the optimizer is configured to: (i) adjust weights of the first neural network based on the discrimination result to improve generation of the fake image by the generator and (ii) adjust weights of the second neural network based on the discrimination result to improve distinguishing a real image from a fake image by the discriminator.

8. The system of claim 1 wherein the first neural network includes:
a down-sampling convolutional block configured to extract features of the target segmentation;
a first concatenation block configured to concatenate the extracted features with a latent vector;
an up-sampling block configured to construct a layout of the fake image using the concatenated extracted features and latent vector;
a second concatenation block configured to concatenate the layout with an attribute label to generate a multidimensional matrix representing features of the fake image; and
an up-sampling convolutional block configured to generate the fake image using the multidimensional matrix.

9. The system of claim 1 wherein the fake image is: an image of a person, an image of a vehicle, or an image of a person in clothes.

10. A method for training an image generator, the method comprising:
training: (i) a generator, implemented with a first neural network, to generate a fake image based on a target segmentation, (ii) a discriminator, implemented with a second neural network, to distinguish a real image from a fake image and output a discrimination result as a function thereof, and (iii) a segmentor, implemented with a third neural network, to generate a segmentation from the fake image, the training including:
by the generator, outputting the fake image to the discriminator and the segmentor; and
iteratively operating the generator, discriminator, and segmentor during a training period, the iterative operating causing the discriminator and generator to train in an adversarial relationship with each other and the generator and segmentor to train in a collaborative relationship with each other, the generator at the end of the training period having its first neural network trained to generate the fake image based on the target segmentation with more accuracy than at the start of the training period.

11. The method of claim 10 further comprising:
training the generator to generate the fake image based on the target segmentation and target attributes.

12. The method of claim 11 further comprising:
training the generator to generate the fake image based on the target segmentation, the target attributes, and a real image.

13. The method of claim 12 wherein a given fake image is a translated version of the real image.

14. The method of claim 11 further comprising:
training the generator to generate the fake image based on the target segmentation, the target attributes, and a latent vector.

15. The method of claim 14 wherein the latent vector is a random vector sampled from a normal distribution.

16. The method of claim 10 wherein causing the discriminator and generator to train in an adversarial relationship with each other includes:
by the discriminator, outputting the discrimination result to an optimizer; and
by the optimizer: (i) adjusting weights of the first neural network based on the discrimination result to improve generation of the fake image by the generator and (ii) adjusting weights of the second neural network based on the discrimination result to improve distinguishing a real image from a fake image by the discriminator.

17. The method of claim 10 wherein the generator, implemented with the first neural network, is trained to generate the fake image by:
at a down-sampling convolutional block, extracting features of the target segmentation;
at a first concatenation block, concatenating the extracted features with a latent vector;
at an up-sampling block, constructing a layout of the fake image using the concatenated extracted features and latent vector;
at a second concatenation block, concatenating the layout with an attribute label to generate a multidimensional matrix representing features of the fake image; and
at an up-sampling convolutional block, generating the fake image using the multidimensional matrix.

18. The method of claim 10 wherein the fake image is: an image of a person, an image of a vehicle, or an image of a person in clothes.

19. A computer program product for training an image generator, the computer program product comprising:
one or more non-transitory computer-readable storage devices and program instructions stored on at least one of the one or more storage devices, the program instructions, when loaded and executed by a processor, cause an apparatus associated with the processor to:
train: (i) a generator, implemented with a first neural network, to generate a fake image based on a target segmentation, (ii) a discriminator, implemented with a second neural network, to distinguish a real image from a fake image and output a discrimination result as a function thereof, and (iii) a segmentor, implemented with a third neural network, to generate a segmentation from the fake image, the training including:
by the generator, outputting the fake image to the discriminator and the segmentor; and iteratively operating the generator, discriminator, and segmentor during a training period, the iterative operating causing the discriminator and generator to train in an adversarial relationship with each other and the generator and segmentor to train in a collaborative relationship with each other, the generator at the end of the training period having its first neural network trained to generate the fake image based on the target segmentation with more accuracy than at the start of the training period.

20. The computer program product of claim 19 where, in causing the discriminator and generator to train in an adversarial relationship with each other, the program instructions cause the apparatus to implement:

by the discriminator, outputting the discrimination result to an optimizer; and by the optimizer: (i) adjusting weights of the first neural network based on the discrimination result to improve generation of the fake image by the generator and (ii) adjusting weights of the second neural network based on the discrimination result to improve distinguishing a real image from a fake image by the discriminator.

\* \* \* \* \*